US012792478B2

(12) United States Patent
Balcha et al.

(10) Patent No.: US 12,792,478 B2
(45) **Date of Patent: *Nov. 10, 2026**

(54) APPLICATION DATA PROTECTION METHOD AND SYSTEM

(71) Applicant: Trilio Data, Inc., Framingham, MA (US)

(72) Inventors: Muralidhara R. Balcha, Holliston, MA (US); David Safaii, Sherborn, MA (US)

(73) Assignee: Trilio Data, Inc., Framingham, MA (US)

(*) Notice: Subject to any disclaimer, the term of this patent is extended or adjusted under 35 U.S.C. 154(b) by 137 days.

This patent is subject to a terminal disclaimer.

(21) Appl. No.: 18/476,006

(22) Filed: Sep. 27, 2023

(65) Prior Publication Data

US 2024/0028488 A1 Jan. 25, 2024

Related U.S. Application Data

(63) Continuation-in-part of application No. 17/476,393, filed on Sep. 15, 2021, now Pat. No. 11,880,282.

(51) Int. Cl.
*G06F 11/00* (2006.01)
*G06F 11/20* (2006.01)

(52) U.S. Cl.
CPC .... *G06F 11/2025* (2013.01); *G06F 2201/805* (2013.01)

(58) Field of Classification Search
CPC ............. G06F 11/2025; G06F 11/2092; G06F 11/2038; G06F 11/1471; G06F 11/2023; G06F 11/2069
See application file for complete search history.

(56) References Cited

U.S. PATENT DOCUMENTS

| | | | | |
|---|---|---|---|---|
| 6,526,521 | B1 * | 2/2003 | Lim | G06F 11/203 709/239 |
| 8,150,810 | B1 * | 4/2012 | Ou | G06F 11/1456 707/649 |
| 9,977,704 | B1 * | 5/2018 | Chopra | G06F 11/0709 |
| 10,613,944 | B2 * | 4/2020 | Kathpal | G06F 11/1469 |
| 10,664,357 | B1 * | 5/2020 | Mallik | G06F 11/1464 |
| 10,740,353 | B2 * | 8/2020 | Horowitz | G06F 11/0709 |
| 10,855,554 | B2 * | 12/2020 | Freeman | H04L 41/5009 |
| 10,884,876 | B2 * | 1/2021 | Dalal | G06F 11/2094 |
| 11,200,207 | B1 * | 12/2021 | Lew | G06F 11/1451 |

(Continued)

*Primary Examiner* — Loan L. T. Truong
(74) *Attorney, Agent, or Firm* — Goodwin Procter LLP

(57) ABSTRACT

A system and method for continuously restoring applications are disclosed. In some embodiments, the system comprises a production cluster with one or more applications running on the production cluster; one or more remote clusters configured to continuously restore the one or more applications running on the production cluster from a backup of each of the one orm ore applications; and an event target configured to communicate the production cluster and the one or more remote clusters, where each of the remote clusters and the production cluster comprises a syncher service and a watcher service executing thereon, and the backup is generated by a backup service on the production cluster based on a backup plan associated with each of the one or more applications. One or more graphical user interfaces may also be generated to display data related to continuous restore operations.

27 Claims, 13 Drawing Sheets

(56) References Cited

U.S. PATENT DOCUMENTS

| | | | | |
|---|---|---|---|---|
| 11,586,507 | B2 * | 2/2023 | Balcha ................ | G06F 11/1451 |
| 11,609,825 | B1 * | 3/2023 | Bharadwaj .......... | G06F 11/1469 |
| 11,822,442 | B2 * | 11/2023 | Kulkarni ............... | G06F 9/5072 |
| 11,921,589 | B2 * | 3/2024 | Shemer ............... | G06F 11/1407 |
| 11,991,077 | B2 * | 5/2024 | Mariappan ............ | H04L 41/046 |
| 12,124,924 | B2 * | 10/2024 | Kanso .................... | G06N 20/00 |
| 12,367,402 | B2 * | 7/2025 | Rane ........................ | G06N 5/04 |
| 2013/0326265 | A1 * | 12/2013 | Garai .................... | G06F 11/203<br>714/E11.089 |
| 2015/0378837 | A1 * | 12/2015 | Bai ..................... | G06F 11/1435<br>707/654 |
| 2016/0154706 | A1 * | 6/2016 | Iwasaki ................. | G06F 11/263<br>707/639 |
| 2019/0236051 | A1 * | 8/2019 | Datta .................... | G06F 16/172 |
| 2020/0042343 | A1 * | 2/2020 | Wang .................. | G06F 9/45558 |
| 2022/0308849 | A1 * | 9/2022 | Kumar ...................... | G06F 8/61 |
| 2022/0350492 | A1 * | 11/2022 | Beedu ..................... | G06F 3/067 |

* cited by examiner

APPLICATION DATA PROTECTION METHOD AND SYSTEM

CROSS-REFERENCE TO RELATED APPLICATION

The present application is a continuation-in-part of and claims the benefit of and priority to U.S. patent application Ser. No. 17/476,393, titled "Container-Based Application Data Protection Method and System" and filed on Sep. 15, 2021, which is hereby incorporated by reference herein in its entirety.

TECHNICAL FIELD

The section headings used herein are for organizational purposes only and should not be construed as limiting the subject matter described in the present application in any way.

BACKGROUND

OpenStack and other cloud-based deployments are growing at an astounding rate. Furthermore, these deployments are relying more on containerized applications. Market research indicates that a large fraction of enterprises will be deploying some form of cloud infrastructure to support applications and services, either in a public cloud, private cloud, or some hybrid of a public and a private cloud. This trend leads an increasing number of organizations to use this type of open-sourced cloud management and control software to build out and operate these clouds.

Data loss and application disruption are major concerns for enterprises deploying this and other cloud management and control software. Unscheduled downtime has a dramatic financial impact on businesses. As such, data protection methods and systems, including disaster recovery solutions, are needed which recover from outage scenarios for application workloads executing on OpenStack® clouds and/or clouds that execute over containerized environments that use, e.g., Kubernetes® and/or OpenShift®. Many backup solutions provide for restoration only at intermittent intervals. While those intervals can, in some cases, be predetermined, controlled, and managed, this can limit the application for critical data loss and application disruption prevention and mitigation. The ability to provide continuous restoration for an application backup can substantially reduce data loss and application disruption for data protection applications and services.

One challenge is that the systems and applications being protected may scale to very large numbers of nodes and those nodes may be widely distributed. Thus, data protection continuous restore systems must be able to scale rapidly both up and down to effectively work across cloud-based application deployments.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

DETAILED DESCRIPTION

Figure 1A:
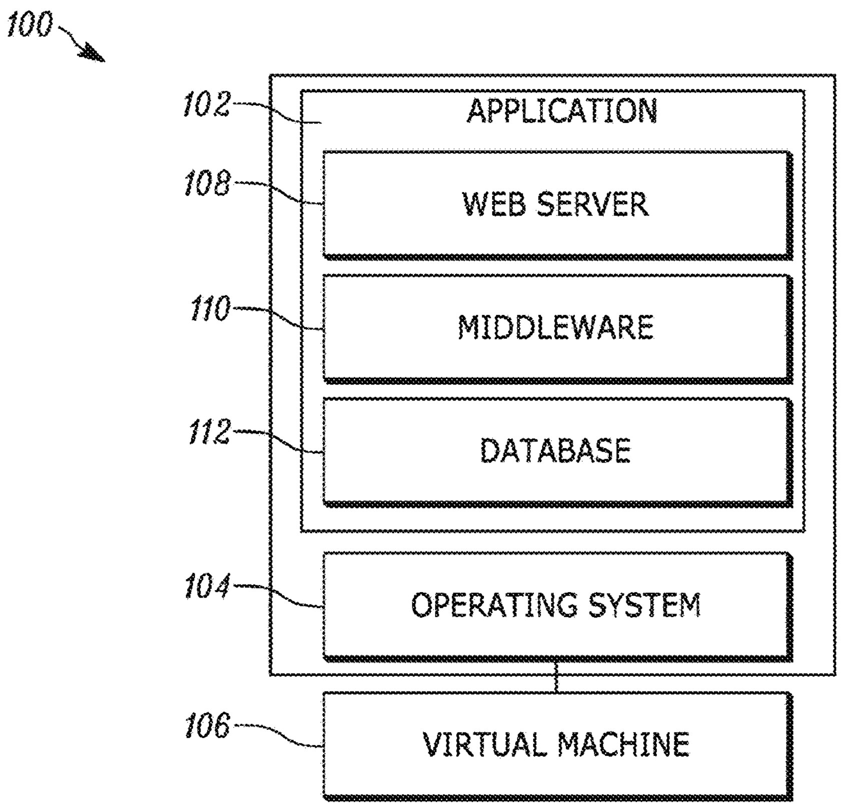
FIG. 1A illustrates a stack for an application that executes using a virtual machine.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present disclosures may be performed in any order and/or simultaneously as long as the teaching remains operable. Furthermore, it should be understood that the system and methods of the present disclosures can include any number or all of the described embodiments as long as the teaching remains operable.

The present disclosure will now be described in more detail with reference to exemplary embodiments thereof as shown in the accompanying drawings. While the present disclosures are described in conjunction with various embodiments and examples, it is not intended that the present disclosures be limited to such embodiments. On the contrary, the present disclosures encompass various alternatives, modifications, and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Data protection, including disaster recovery and continuous restore, has become an important challenge as enterprises evolve OpenStack, OpenShift, and/or Kubernetes and similar projects from evaluation to production. Corporations protect data using backup and recovery solutions to recover data and applications in the event of a total outage, data corruption, data loss, version control (roll-back during upgrades), and other events. Software developers utilize data protection techniques for, e.g., version control, quality assurance, and other development activities. Organizations typically use internal service-level agreements for recovery and corporate compliance requirements as a means to evaluate and qualify backup and recovery solutions before deploying the solution in production.

Continuous restoration for an information technology infrastructure can involve the recovery and/or continuation of vital applications and systems following a natural or human-induced disaster. A continuous restore use case can often be associated with business-critical applications that cannot suffer any downtime. These applications require 100% uptime, and in the event of a disaster, the application is expected to fail over to a remote site almost instantaneously and without suffering any data loss.

One feature of the present disclosure is that it provides a backup media continuous restore for cloud-based infrastructure. The continuous restore system and method of the present disclosure are efficient and effective for hybrid clouds. This is because the system and the method of the present disclosure can operate with multiple, and/or different control planes. The continuous restore system and method of the present disclosure is efficient and effective for containerized applications at least because it can restore in connection with an application template associated with containerized applications. This is important because containerized applications have features that can make traditional continuous restore solutions unwieldy, slow, and not scalable.

One feature of the present disclosure is that it provides robust application-specific backup and restore workflows that can handle different application types, including helm releases, operators, labels, and namespaces. However, support for additional application types is also possible. This can be particularly important as the Kubernetes platform evolves into a more mature platform with additional application types. For example, as Kubernetes is evolving into a multi-cloud management platform, continuous restore use for such platforms is becoming critical for organizations with cloud-based infrastructures. New solutions are needed to address multi-cloud use cases, including application mobility, continuous restore, and multi-cloud data management. Continuous restore workflows of the present disclosure can address this need.

Cloud-based systems offer some application programming interfaces (APIs) that can be used to generate a backup. However, these APIs alone are not sufficient to implement and manage a complete backup solution, nor a more complex disaster recovery, failover, solution. In addition, each cloud deployment is unique, at least in part because the systems are modular, with multiple options to implement cloud-based applications and containerized applications. Users have a choice of various hypervisors, storage subsystems, network vendors, projects, and various open-source management and orchestration platforms.

One feature of the present disclosure is that it supports continuous restore for hybrid clouds and container-based workloads. Hybrid clouds include cloud resources and services that combine at least one or more private cloud resources, third-party cloud resources, public cloud resources, on-premise resources, and/or other cloud-based resources and services. Hybrid clouds may also include at least one or more cloud orchestration platforms.

The present disclosure supports continuous restoration for hybrid cloud-based information systems that utilize container-based applications. The technology supports, for example, OpenStack and Red Hat® Virtualization environments, and OpenShift Virtualization and KubeVirt environments. The technology allows systems to recover from disasters, migrate tenant workloads, move workloads to new infrastructures, and migrate to new infrastructure software distributions.

In addition, the present disclosure provides continuous restore for distributed computing environments, such as private and public clouds, private data centers, and hybrids of these environments. One feature of the present disclosure is that it can provide continuous restore operations using object storage systems as a backup target, or repository. For example, the system and method of the present disclosure may utilize scalable cloud-based backup and restoration methods as described in, e.g., U.S. Provisional Patent Application Ser. No. 62/873,618, entitled "Scalable Cloud-Based Backup Method" and in U.S. patent application Ser. No. 17/098,668, entitled Container-Based Application Data Protection Method and System. The entire contents of U.S. Provisional Patent Application Ser. No. 62/873,618 and U.S. patent application Ser. No. 17/098,668 are incorporated herein by reference. While there are some advantages to using object storage systems as a backup target in today's cloud environment, it is understood by those skilled in the art that the present disclosure is not so limited. In addition, or alternatively, to object storage, the method and system of the present disclosure can provide continuous restore operations using, for example, network file system (NFS) storage as a backup target.

The application and system being recovered in various embodiments of the present disclosure can be part of a cloud computing system, such as, for example, a system that is executing a Kubernetes and/or OpenShift software platform in a cloud environment. Kubernetes is an open-source project and framework for cloud computing for container orchestration and automated application deployment, scaling, and management. Kubernetes is also referred to as K8s. OpenShift is open-source software offered by Red Hat that is a container application platform based on top of Docker® containers and Kubernetes container cluster manager platforms. It should be understood that the present disclosure is not limited to the use of Kubernetes and/or OpenShift software platforms. It can apply to any type of cloud-based computing system and/or container environment that makes virtual servers and other virtual computing resources available as a service or platform to customers.

The present disclosure applies to the continuous restoration of applications and associated workloads implemented in any combination of the configurations described herein. As will be clear to those skilled in the art, various aspects of the system and various steps of the method of the present disclosure are applicable to various types of computing environments, including computing resources and services available in private and public data centers and/or cloud and/or enterprise environments. Various aspects of the system and various steps of the method of the present disclosure are applicable to various known control and management software platforms and services.

The present disclosure is described herein with respect to both applications and workloads. In general, an application represents software that performs a desired function. A workload, which is sometimes referred to as an application workload, also includes all the resources and processes that are necessary, or utilized, to make the application run. This can include, for example, storage and/or network resources. A feature of the data protection method and system of the present disclosure is that it not only provides for the data protection of the application but also for the data protection of the workload associated with that application. A user or end system may, in some methods, specify the scope of the data protection. Thus, it should be understood that reference to application, application workload, or workload in a particular description does not necessarily limit the scope of the present disclosure. However, an important feature of the present disclosure is the recognition that information systems are now reliant on workloads to perform computing tasks, and these workloads represent a more complex set of functions and services than, for example, a set of individual applications and associated data that run on individual machines. Thus, recovering a computer system requires more than backing up a collection of applications and/or data. It also requires information on the management structure, connectivity, and/or associated data to be included as part of the backup process. The computer-implemented method of continuous restore for containerized applications of the present disclosure addresses the challenges in providing effective and complete backup, migration, and/or restoration of the applications and services that run on these platforms.

Another feature of the present disclosure is the recognition that modern applications executing on virtual machines and/or using containers have an associated and integral management structure/information that is needed to execute them. This management structure is provided, in some cases, by templates. An example template is the Helm® chart in Kubernetes. An effective and efficient backup and restoration solution needs to appropriately discover and maintain this additional information associated with the template (or other management structure), as well as the associated data of the application. Thus, as one example, some embodiments of the present disclosure create a backup manifest that maintains the relevant information to back up and/or restore not only application data, but necessary configuration information to run the application at the desired point in time.

Another feature of the present disclosure is that it supports application workload backup and restoration for applications executing on virtual machines. FIG. 1A illustrates a stack 100 for an application that runs using a virtual machine. As can be seen from the figure, application 102 is set monolithically over the operating system 104 that is executing on a virtual machine 106. The application services include web server 108, middleware 110, and database 112 services that run using the operating system 104.

Figure 1B:
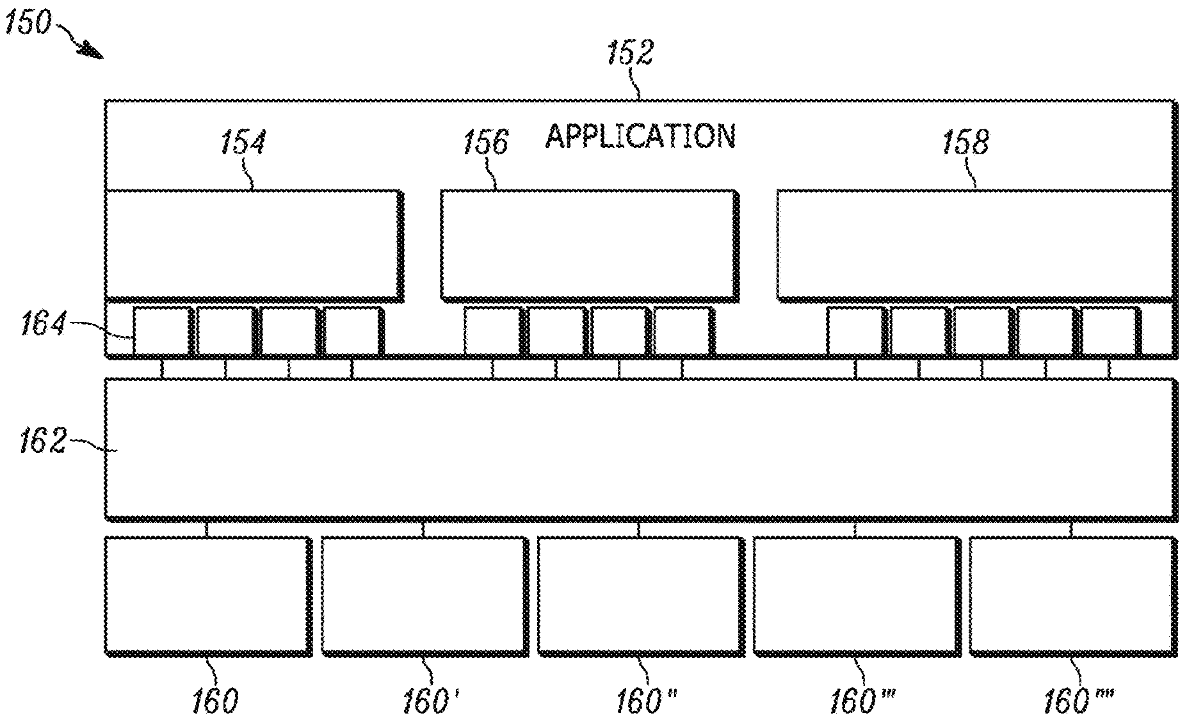
FIG. 1B illustrates a stack for a containerized application that executes using a container system.

Another feature of the present disclosure is that it supports application workload backup and restoration for applications executing using containers that execute on virtual machines and/or physical machines. FIG. 1B illustrates a stack 150 for a containerized application 152 that runs using a container system. The application 152 includes microservices 154, 156, and 158 connected to processing machines 160, 160', 160", 160'", 160"" via a container management system 162. In various embodiments, the processing machines 160, 160', 160", 160'", and 160"" can be physical machines, virtual machines, or a combination thereof. The container management system 162 is connected to the various services 154, 156, 158 of the application 152 using various computing units 164. The computing units 164 generally include one or more containers that are typically collocated and scheduled as a unit to support a particular compute capability, or set of capabilities (e.g., networking, processing, storage) that are needed for the various services 154, 156, 158 to which they connect. The container management system 162 manages the computing units 164 that run on the computing resources provided by the underlying processing machines 160, 160', 160", 160'", 160"".

Figure 2:
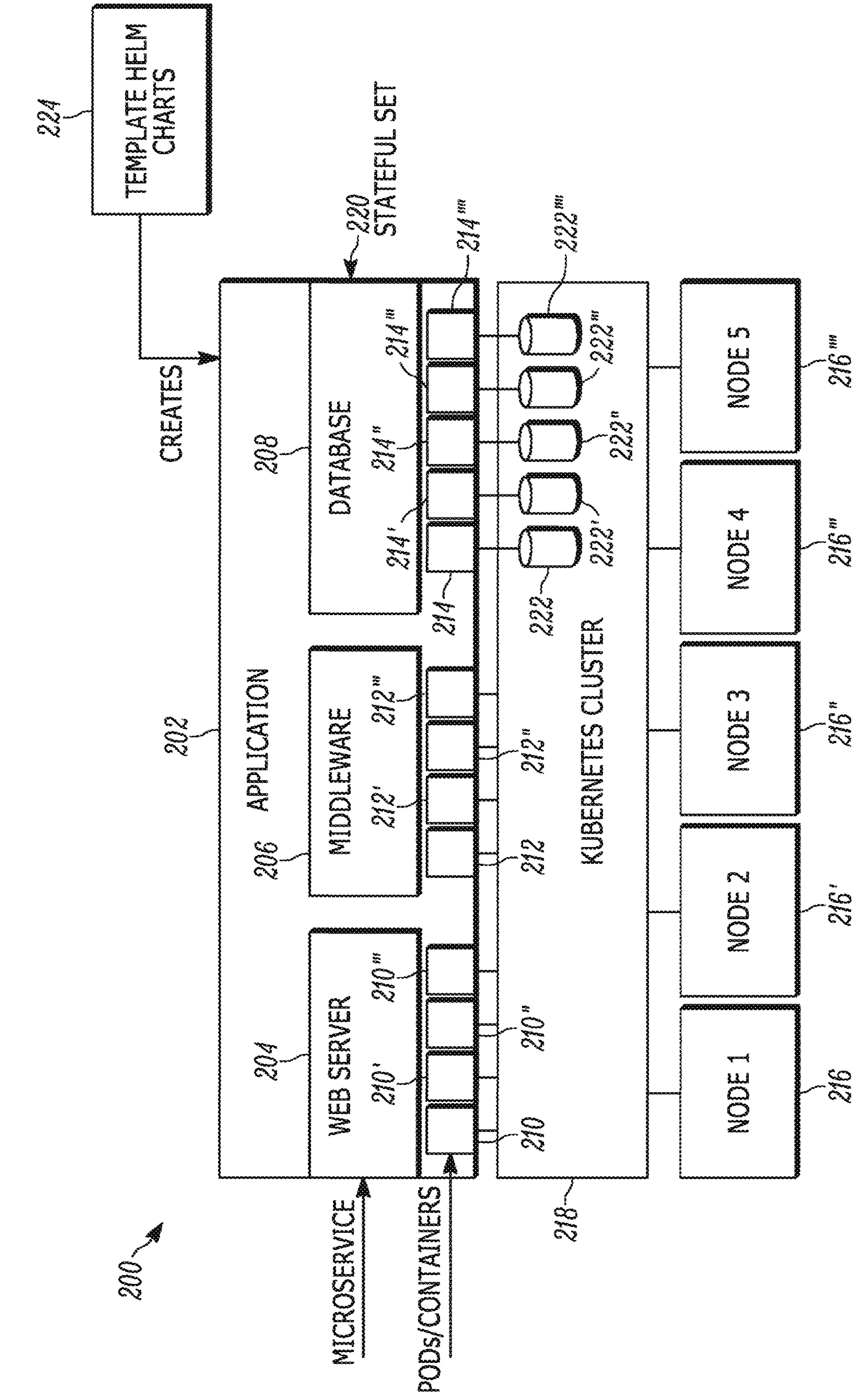
FIG. 2 illustrates a containerized application stack for an application that is included in a continuous restore policy executing on a Kubernetes cluster of the present disclosure.

FIG. 2 illustrates a containerized application stack 200 for an application that is included in a continuous restore policy executing on a Kubernetes cluster of the present disclosure. The application 202 includes three microservices, a web server service 204, a middleware service 206, and a database service 208. Each microservice 204, 206, and 208 runs using multiple pods. A pod is the smallest deployable computing unit in a Kubernetes environment. Generally, a pod is a module of network, compute, storage, and application components that work together to deliver a computer processing application or service. As understood by those skilled in the art, the term pod, which arose from the acronym for point of delivery, is used to describe the computing unit at least in part because the resources used to execute a pod can represent a wide variety of computing infrastructure. In Kubernetes, a pod is a grouping of one or more containers that operate together. The web server service 204 uses four pods 210, 210', 210", and 210'". The middleware service 206 uses four pods 212, 212', 212", 212'". The database service 208 uses five pods 214, 214', 214", 214'", 214"". In some embodiments, each pod comprises one or more Docker containers, which is a set of coupled software-as-service and platform-as-service products that use operating-system-level virtualization to develop and deliver software in containers. The pods 210, 210', 210", 210'", 212, 212', 212", 212'", 214, 214', 214", 214'", 214"" run on five Kubernetes nodes 216, 216', 216", 216'", 216"", that may be virtual processing machines or physical processing machines. A Kubernetes cluster 218 manages the pods 210, 210', 210", 210'", 212, 212', 212", 212'", 214, 214', 214", 214'", 214"" and the nodes 216, 216', 216", 216'", 216"". The Kubernetes cluster 218 includes a control plane, which is a collection of processes executing on the cluster, and a master that is a collection of three processes that run on a single one of the nodes 216, 216', 216", 216'", 216"" on the cluster. The three processes for the master are an API server, a controller manager, and a scheduler.

Each application pod 210, 210', 210", 210'", 212, 212', 212", 212'", 214, 214', 214", 214'", 214"" may have an associated stateful data set, and thus, an associated persistent storage volume. This is sometimes referred to as a persistent volume or PV.

Comparing stack 200 with the generalized container application stack 150 of FIG. 1B, and referring to both FIG. 1B and FIG. 2, the computing units 164 are equivalent to the pods 210, 210', 210", 210'", 212, 212', 212", 212'", 214, 214', 214", 214'", 214"". The management system 162 is equivalent to the Kubernetes cluster 218. The underlying processing machines 160, 160', 160", 160'", 160"" are equivalent to the nodes 216, 216', 216", 216'", 216"".

Managing storage is distinct from managing computation. A persistent volume (PV) may be a piece of storage in a Kubernetes cluster. The Kubernetes application 202 has a stateful set 220 for the database service 208. The database service 208 pods 214, 214', 214", 214'", 214"" require ordering and uniqueness. Each pod 214, 214', 214", 214'", 214"" has an associated persistent volume 222, 222', 222", 222'", 222"" in the Kubernetes cluster 218. In some embodiments, the persistent volumes are pieces of storage in the cluster that may be provisioned statically by an administrator, or dynamically provisioned using storage classes, or profiles of the storage based on, for example, quality of service, type, and/or backup or other policies.

In some embodiments, application 202 is created from a template Helm chart 224. Helm is an open-source package manager for Kubernetes. Helm uses Helm charts, such as template Helm chart 224. In general, Helm charts are used to define, install, and upgrade Kubernetes applications. Each Helm chart is a collection of files in a directory that describe a related set of Kubernetes resources. Helm charts can be simple or complex where they contain many resources. Each Helm chart contains version information in a Chart.yaml file. One feature of the system and method to protect data of the present disclosure is that it can be run on a Kubernetes cluster.

Application 202 described in connection with FIG. 2 may be an application that is part of a fail-over operation of various embodiments of the method and system of the present disclosure. In addition, or instead, the application 202 described in connection with FIG. 2 may be an application that is executing the failover function of various embodiments of the method and system of the present disclosure. A feature of applications configured according to an embodiment of FIG. 2 is a cloud-native system that can scale rapidly and efficiently up to large sizes and down to small sizes of nodes and/or other computing elements.

Figure 3:
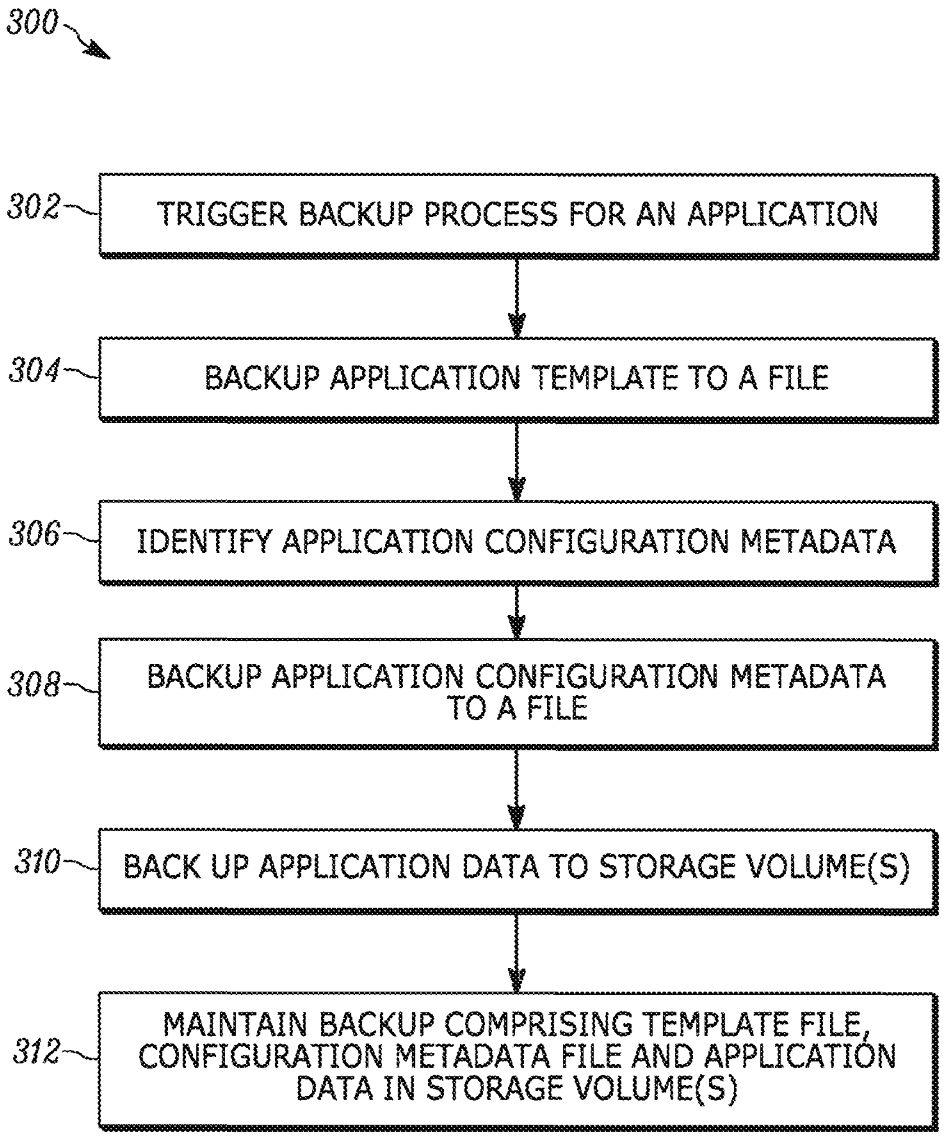
FIG. 3 illustrates a flow diagram for an embodiment of a method of container-based application data protection backup in a continuous restore method of the present disclosure.

FIG. 3 illustrates a flow diagram 300 for an embodiment of a method of container-based application data protection backup in a continuous restore method of the present disclosure. The application to be backed up is defined by a template. The template can include, for example, the number of virtual machines (VMs), what kind of VM, VM operating system, network identifiers for one or more networks being used, storage identifiers for one or more storage systems being used, various internet protocol (IP) addresses, and/or other details about the configuration of the infrastructure that is supporting the application. The templates can be, for example, Helm charts (Kubernetes), terraforms (Hashi Corp.), cloud formation (Amazon), and/or Heat (Open Stack).

In step 302, a backup process/service is triggered. The trigger for a backup can take many forms including, for example, a scheduled trigger, a trigger defined by a policy, a user-initiated trigger, a one-click initiated trigger, or other forms of trigger. The trigger can occur on a regular time pattern, or the trigger can occur at random times. The trigger can be initiated by a command in a Helm chart or other template. The trigger can also be initiated from a graphical user interface (GUI).

In some embodiments, the backup process or service is performed on a local/production cluster for generating backup(s) of an application and copying backups to a data storage/backup target based on the backup plan(s) associated with the application. A backup plan includes all policies regarding application backup such as scheduling policies, retention policies, continuous restore policies, etc. A schedule policy defines at least a frequency at which backups of an application are generated and a type of backup (e.g., a full backup or incremental backup). A retention policy defines at least the number of backups to retain. A continuous restore policy defines all remote clusters the application needs to be restored and the number of backups to be restored on each remote cluster. A typical backup plan may include information about what applications to be backed up, how frequently the application should be backed up, what type of backup to perform, and how many backups to retain. When the continuous restore is performed, the backup plan may further specify the remote cluster(s) to which the backup is restored and the number of consistent sets to maintain.

In step 304, the defined application template is backed up to a file. In step 306, the application's configuration metadata is identified. This configuration identification step 306 may include, for example, a discovery process on the cloud-based infrastructure to determine the application's configuration metadata. The discovery process in some embodiments is guided by the application template information. In step 308, the application's configuration metadata identified in step 306 is backed up to a file. In some embodiments, the application configuration includes all yaml files that relate to pods, secrets, config resources, images, IP addresses, PV, and persistent volume claims (PVCs).

In step 310, the application data is backed up to a storage volume, or volumes. In some embodiments, the stateful set of services of the application is determined and the data in the storage volumes associated with the application are stored in a backup storage volume. In step 312, the backup comprising the template file, the configuration metadata file, and the application data is maintained.

The backup process/service used in the backup steps of the method flow diagram 300 can utilize, for example, the backup process described in U.S.Provisional Patent Application Ser. No. 62/873,618, which is incorporated herein by reference. The backups may be incremental or full backups at various backup times, as understood by those skilled in the art.

Figure 4:
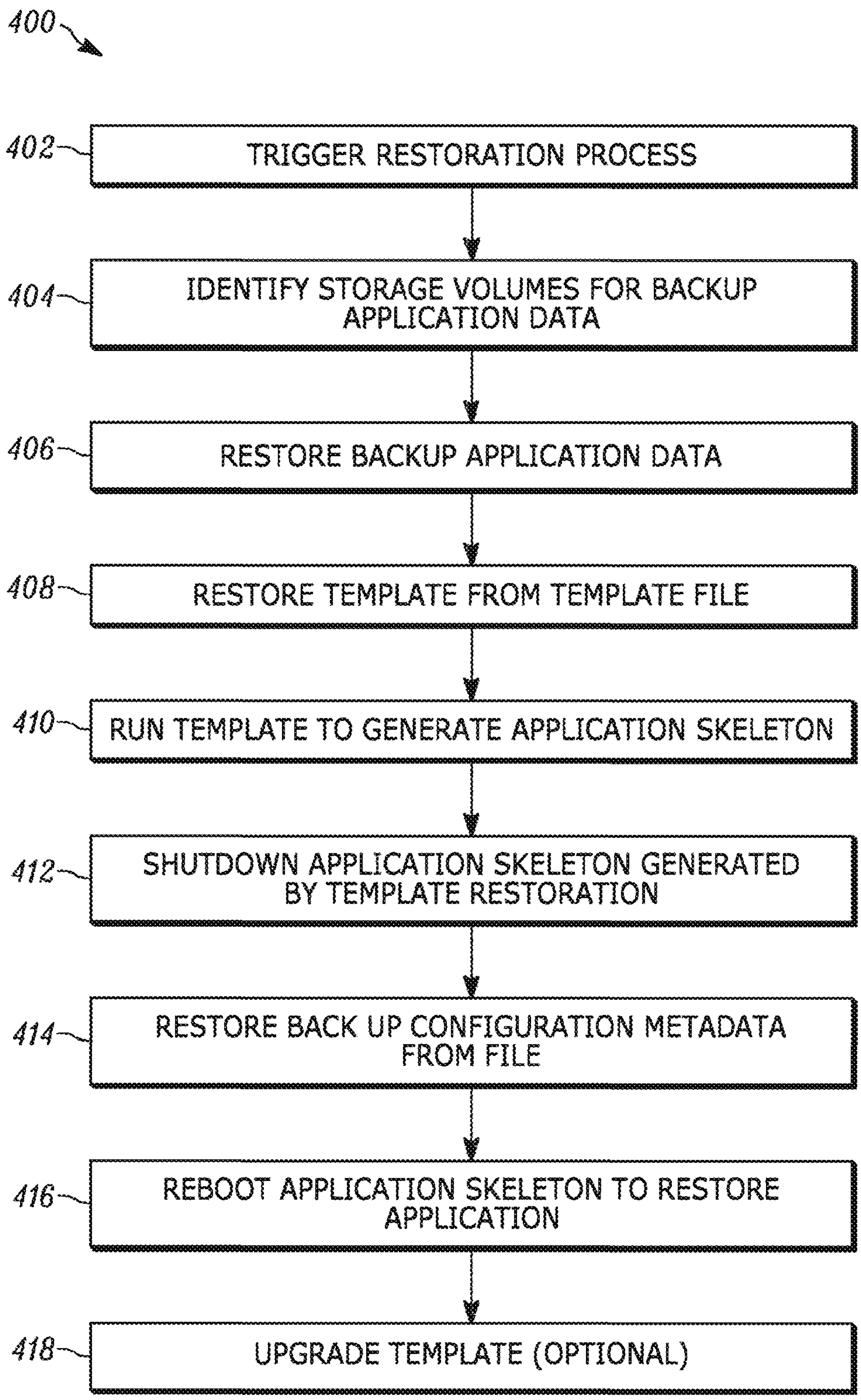
FIG. 4 illustrates a flow diagram for an embodiment of a method of container-based application data protection restore in a continuous restore method of the present disclosure.

FIG. 4 illustrates a flow diagram 400 for an embodiment of a method of container-based application data protection restore in a continuous restore method of the present disclosure. The restore process in flow diagram 400 can work with the files and backup storage volumes that were generated in the method of container-based workload data protection backup described in connection with FIG. 3.

Referring to both FIGS. 3 and 4, in step 402, a restore process is triggered. The trigger for the restoration can take many forms including, for example, being a scheduled trigger, trigger or triggers that are defined by a policy, user-initiated, one-click initiated, and other forms of triggers. The trigger can occur on a regular time pattern, or the trigger can occur at random times. The trigger can be initiated by a command in a Helm chart or other template. The trigger can be initiated by a graphical user interface.

One feature of the present disclosure is that it supports a simple restore initiation. In some embodiments of the method of the present disclosure, an entire application is restored from a point-in-time. In other embodiments, a policy-based global job scheduling initiates the restoration. In yet other embodiments, restoration is initiated with a single click. In some embodiments, restoration is provided with a copy to a new location or availability zone. Also, in some embodiments, the restore process migrates one or more applications to a new Kubernetes cluster.

In step 404, the restore storage volumes for the application data being restored are identified. In step 406, the application data is restored from backup storage volumes. The backup storage volumes and backed-up application data may have been generated in a backup step 310 and maintained in step 312 of the backup method flow diagram 300 described in connection with FIG. 3.

In step 408, the template is restored using the template file. Referring back to FIG. 3, the template file may have been created by a backup process in step 304 and maintained in step 312 of backup method flow diagram 300. In step 410, the template file is run to generate an application skeleton. By application skeleton, we mean the application does not yet have any data. In step 412, the generated application skeleton is shut down.

In step 414, the backup configuration metadata is restored from a file. Again, referring back to FIG. 3, the file may be the application configuration metadata file generated in step 308 and maintained in step 312 of the backup method flow diagram 300.

In step 416, the application skeleton is rebooted. The reboot of the application skeleton thus successfully restores the application and its associated stateful information associated with the particular backup information (files and data in storage volumes) that was chosen to be restored. In some embodiments, various steps of the method utilize the restore techniques as described in U.S. Provisional Patent Application Ser. No. 62/873,618. Restorations can proceed with any backup point in time as desired and available.

In an optional step 418, the application template is upgraded. For example, an upgrade can be desired if a new version of software involved in the application workload is available, and the upgrade will move the version of the restored upgraded application to the new version.

Figure 5:
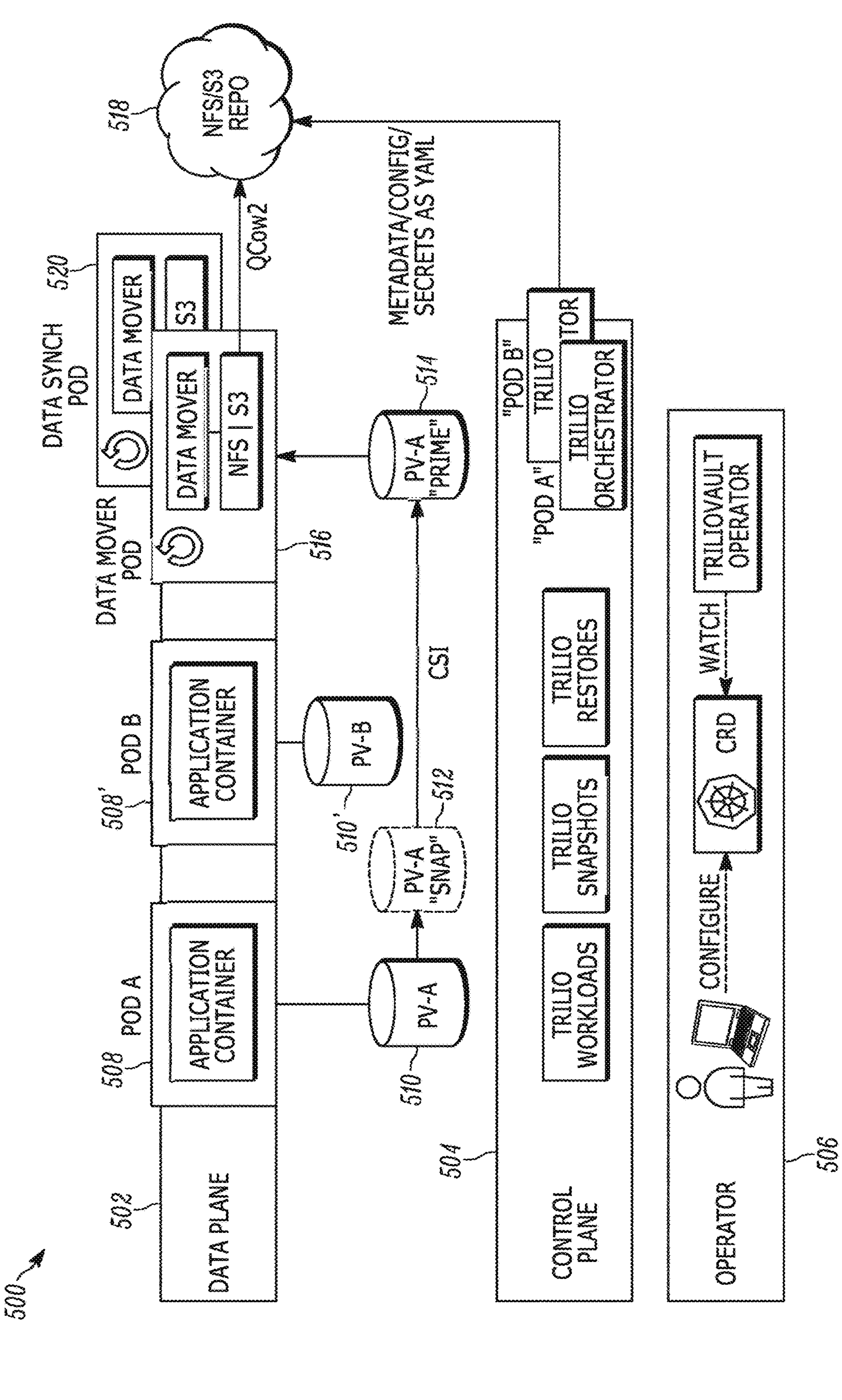
FIG. 5 illustrates a system diagram for an embodiment of a container-based application workload data protection and continuous restore of the present disclosure.

FIG. 5 illustrates a system diagram 500 for an embodiment of a container-based application workload data protection and continuous restore system of the present disclosure. Embodiments of the method and system for continuous restore of the present disclosure can include not only traditional backup and restoration of the data plane 502, but also backup of the control plane 504 and of the operator layer 506 information. This approach is particularly useful for systems that run and/or develop applications using a container-based approach. Application pods 508, 508', Pod A, and Pod B, have stateful information data in persistent volumes 510, 510', PV-A, PV-B. In some embodiments, the persistent volumes 510, 510' are network file systems (NFS). For a data backup, a snapshot 512 of PV-A volume 510 can be created and a new persistent volume 514 is created from the snapshot. A snapshot is a point-in-time copy of the data stored on a storage system, which serves as a backup or recovery point and captures the state of the storage system at a specific moment. The new persistent volume 514 is attached to a data mover pod 516. The data mover service copies the persistent volume 514 to repository 518. A data synch pod 520 also performs reads and writes with repository 518. The data synch pod 520 is spun up to synchronize existing PV data from the latest backup images to a remote site PV as described herein.

A data synch pod 520 exists at sites that are acting as remote sites for applications subject to a continuous restore policy. A data mover pod 516 exists at sites that are acting as production sites for applications subject to a continuous restore policy. In general, a single site can be a remote site, a production site, or both. Different applications may be considered remote or production applications, even if they are on the same site. Thus, a single site may have data mover pods 516 associated with a production site application slated for recovery operations, and the site may have data synch pods 520 associated with a remote site application slated for recovery operations.

Note that there is generally no limitation on the number of production clusters and remote clusters. In fact, no cluster is designated as a production cluster or a remote cluster. A cluster may be a production cluster for one application and may act as a standby (remote) cluster for another application. As understood by those skilled in the art, various applications may be arranged within a cluster and/or within a namespace that is part of a cluster, depending on the structure of the applications within a particular Kubernetes framework.

The continuous restore system 500 is flexible and supports multiple protocols for distributed storage to act as a repository 518. The repository 518 may be, for example, Amazon simple storage service (S3) or another repository. In some embodiments, the file format may be QCOW2 for backup images. QCOW2 is a known file format for disk image files. QCOW stands for QEMU copy-on-write, where QEMU (Quick EMUiator) is an open-source machine emulator and virtualizer.

For the control plane 504 backup and restoration, a variety of application-related configuration information, secrets information (e.g., passwords, keys, and privileges), and metadata are discovered and backed up to the repository 518. For example, this information may be stored in the backup repository 508 as an application information file. This information can be used for the restoration step(s) in recovering an application at a remote site.

At the operator plane 506, application templates are associated with the application to be backed up. These may include a Helm chart or other template. The template may include common resource definitions and other information about the application. This information may be stored as a template file and stored in the repository 518. Thus, one key advantage of the data protection system and method of the present disclosure is that, for a particular application to be backed up, not only is the application data backed up, but the template is backed up as well as the configuration metadata information and relevant application information. This information can be used for the restoration step(s) in recovering an application using a restore operation at a remote site. As such, the approach supports fast and efficient continuous restore of applications that run on containers.

Some embodiments of the present disclosure use the Helm parser and/or application configuration reader/loaders at setup. A user application deployed using Helm charts should be parsed and generate viable Workload CRDs (workload custom resource descriptors). An example workflow proceeds as follows. The user can have the following scenarios: 1) application with multiple releases, or 2) application with multiple revisions. An assumption is that a single release will be considered as a single workload.

Creating a workload out of the user application proceeds as follows: 1) get the latest version of the release; 2) since Helm release names are unique across K8s clusters, perform a one-to-one mapping for RELEASE_NAME->TRILIO-VAULT_WORKLOAD NAME; 3) get a list of all the PVs and PVC; and 4) backup the release content directly since it can be created with no dependencies and will be managed differently (release content includes: templates-all the K8s resources like Pods, Sts, Dep, Svc, PV, PVC, Crds, etc., chart metadata, manifests, configuration, dependencies, files, backup PVs and PVC data, as appropriate).

An operator is a method of packaging, deploying, and managing a Kubernetes application. A Kubernetes application may be described as an application that is both deployed on Kubernetes and managed using the Kubernetes APIs and kubectl tooling. The operator software development kit (SDK) enables developers to build operators based on their expertise without requiring knowledge of the complexities of the Kubernetes API. The operator lifecycle management oversees installation, updates, and management of the lifecycle of all of the operators (and their associated services) executing across a Kubernetes cluster. Possible user-deployed operators have types, for example: Go, an operator that has the business logic written in Golang to deploy and manage the applications, Helm, and Ansible. Note that a single operator can manage multiple instances of an application.

For embodiments of the present disclosure that use Helm charts, the Helm Go Client can be used for all the transactions with Helm charts. See, for example, U.S. patent application Ser. No. 17/098,668, entitled Container-Based Application Data Protection Method and System. U.S. patent application Ser. No. 17/098,668 is incorporated herein by reference.

One feature of the present disclosure is that it can support continuous restore via either a backup media approach or a storage-level data replication approach described above. Kubernetes is a container orchestration platform that relies on the declarative semantics of the resources to provide a highly reliable and available platform. One feature of the present disclosure is the recognition that the declarative nature of the semantics, as opposed to imperative, is useful for defining continuous restore workflows.

A major element of a continuous restore workflow is storage and, for some embodiments, this storage can be Kubernetes storage. Kubernetes storage has two important constructs called PhysicalVolume and PhysicalVolumeClaim. A Persistent Volume (PV) is a piece of storage in the cluster that has been provisioned by an administrator or dynamically provisioned using Storage Classes. It is a resource in the cluster, just like a node is a cluster resource. Persistent volumes are volume plugins like Volumes but have a lifecycle independent of any individual pod that uses the PV. This API object captures the storage implementation details, be that NFS, iSCSI, or a cloud provider-specific storage system.

A PersistentVolumeClaim (PVC) is a request for storage by a user. It is similar to a Pod. Pods consume node resources, and PVCs consume PV resources. Pods can request specific levels of resources (CPU and Memory). Claims can request specific size and access modes (e.g., they can be mounted ReadWriteOnce, ReadOnlyMany, or ReadWriteMany, see AccessModes).

Continuous restore systems and methods of the present disclosure can create PV resources for every PV discovered in the backup plan. Different PVCs are created at different points in the workflow for the same PV. For example, a data synch pod PVC is used to transfer backup data to the PV. An Application pod PVC is used while restoring the application.

One embodiment of the present disclosure focuses on backup media restoration of the continuous restore use case. For example, assume that there are two Kubernetes clusters, one production, and another remote site. A continuous restore application is installed on both clusters, and backup plans are set up for various production cluster applications. The continuous restore application performs backups at the intervals specified by the backup plan policies. For the argument of simplicity, we also assume that both the clusters are configured to use one backup target (repository), perhaps an S3 bucket, but the present disclosure is not so limited.

Figure 6A:
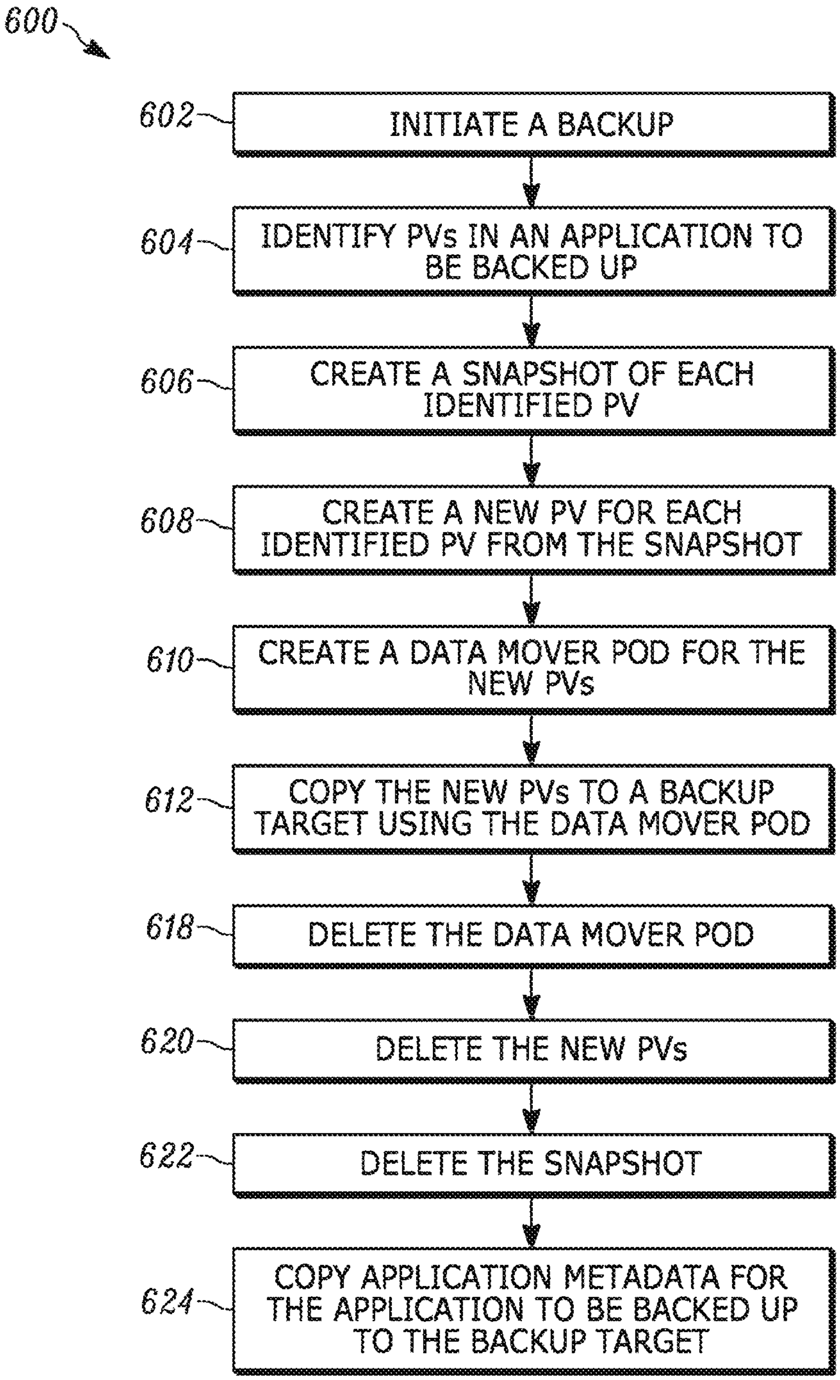
FIG. 6A illustrates a flow diagram for an embodiment of a method of container-based application continuous restore backup of the present disclosure.

FIG. 6A illustrates a flow diagram for an embodiment of a method of container-based application continuous restore backup of the present disclosure. A backup is initiated in step 602. This may be implemented, for example, by user command in a GUI, and/or through a backup plan schedule. In step 604, all PVs in the given application to be backed up and subject to continuous restore policy, are identified. In step 606, a snapshot of each identified PV is created. In step 608, a new PV from the snapshot is created. In step 610, a data mover for every newly created PV is created. In step 612, the data mover pod copies PV data to backup media. The backup media, also referred to as a backup target, is a storage repository. In step 618, the data mover pods are deleted after the backup is done. In step 620, the new PV is deleted. In step 622, the snapshot is deleted. In step 624, the application metadata for the application to be backed up is copied to the backup target.

Figure 6B:
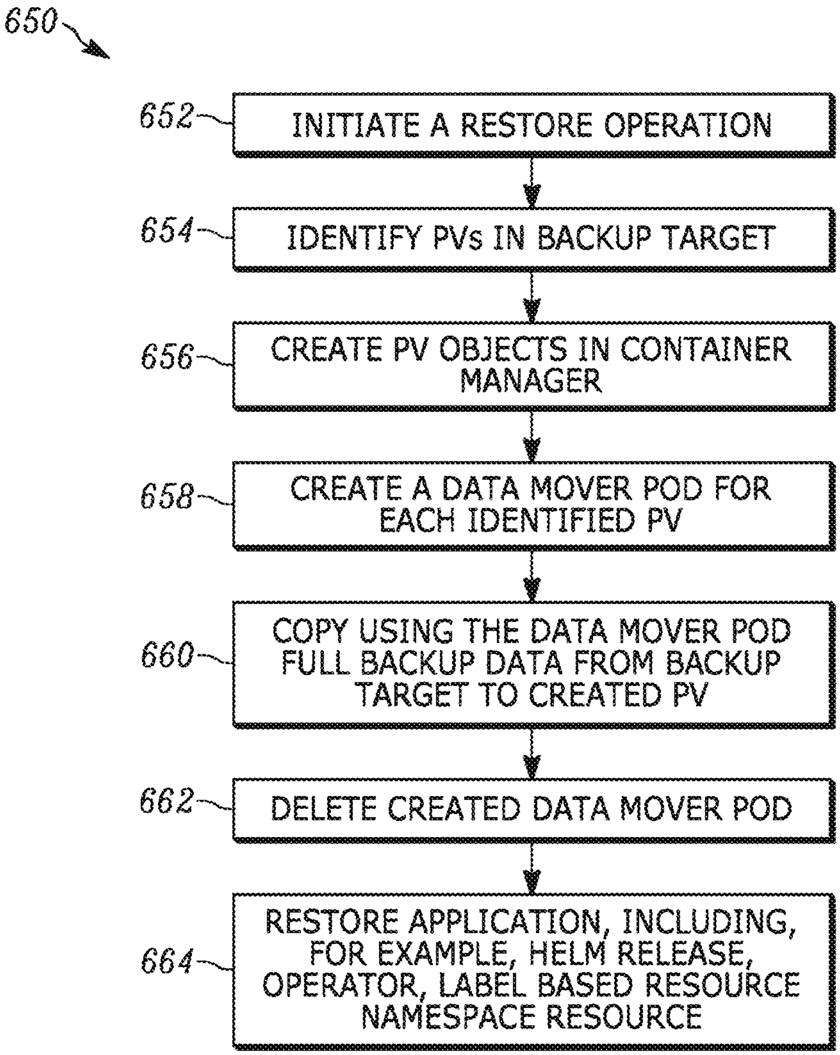
FIG. 6B illustrates a flow diagram for an embodiment of a method of container-based application continuous restore of the present disclosure.

FIG. 6B illustrates a flow diagram 650 for an embodiment of a method of container-based application continuous restore of the present disclosure. In step 652, a restore operation is initiated. The initiation can be triggered by a continuous restore policy. The initiation can be triggered by a user, or in an automated way. The initiation can be a result of a disaster outage. The initiation can be a result of a desire to initiate a failover test. In step 654, the PV resources in a backup associated with the application to be recovered are identified. In step 656, PVs are created for each identified PV. In some embodiments, the created PVs are PV objects in a container manager, for example, a Kubernetes container manager. In step 658, a data mover pod is created for every created PV. In step 660, the data mover pod copies the backup data to the created PV. In step 662, the data mover pods are deleted. In step 664, the application is restored. This includes the restoration of any or all of the Helm release, the operator, the label-based resources, and the namespace resources associated with the application.

Figure 7:
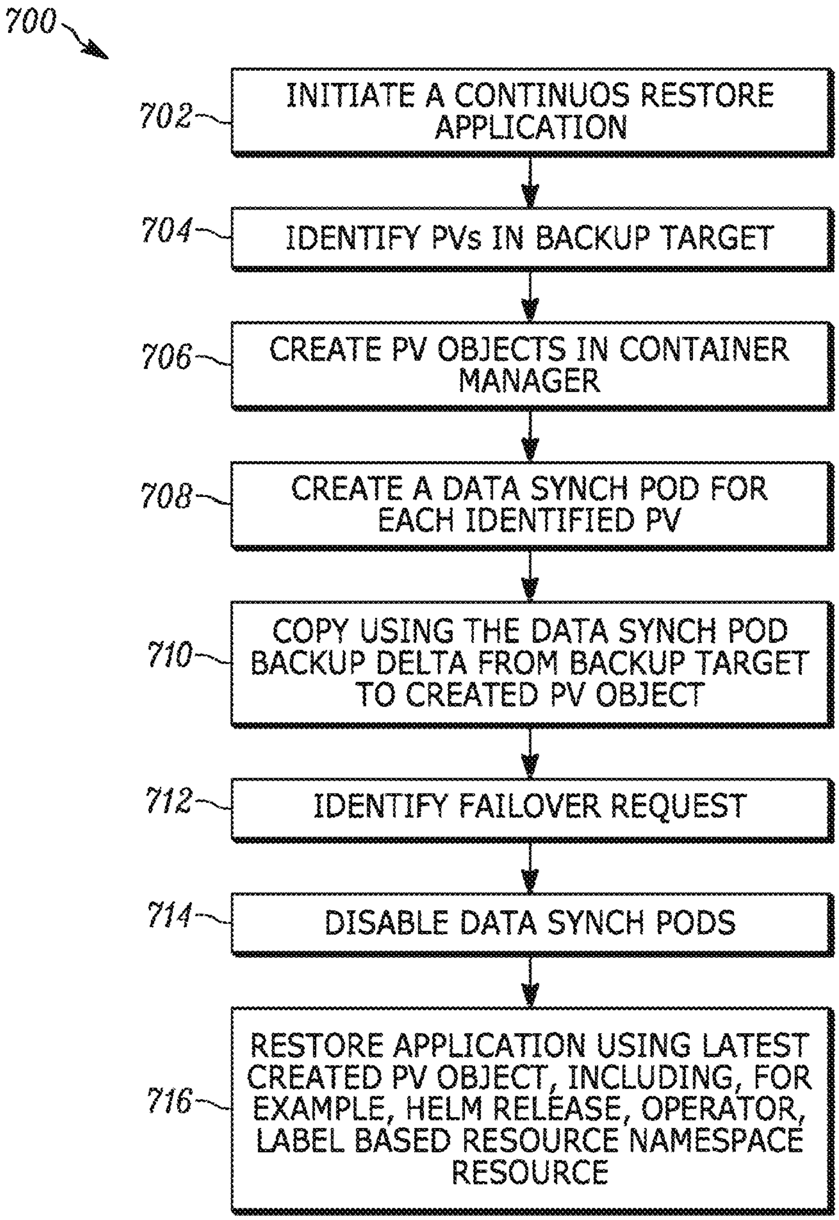
FIG. 7 illustrates a flow diagram for an embodiment of a method of container-based application continuous restore fail over of the present disclosure.

FIG. 7 illustrates a flow diagram 700 for an embodiment of a method of container-based application continuous restore fail over of the present disclosure. The workflow of a continuous restore can include some or all of the steps of the method for backup and restore described in connection with FIGS. 6A and 6B. A continuous restore workflow can be configured to support two different operations, failover and test failover. A failover operation is triggered in response to an outage, while a test failover is triggered in response to a scheduled or unscheduled desire to test the fail over operation.

In step 702, a continuous restore operation for an application is initiated. In step 704, the associated PVs for the application are identified in a backup target. In step 706, PV objects for the identified PVs are created. In some embodiments, the created PVs are PV objects in a container manager, for example, a Kubernetes container manager.

In step 708 a data synch pod is created for each identified PV object. In some embodiments, PVCs are created to data synch pods. Data sync pods are very similar to data mover pods but only apply the latest backup delta to a particular PV. A data synch pod synchronizes PVs to the latest backup contents. In step 710, the data synch pod copies the latest backup delta from the backup target to the created PV object.

In step 712, a failover request is identified. In step 714, the data synch pods are disabled. This ensures no data sync pods are executing. In step 716, the application is restored, and application recovery is successful. This includes the restoration of any or all of the Helm release, the operator, the label-based resources, and the namespace resources associated with the application.

In some embodiments, the system and method operate in a test failover mode. This mode includes all the steps for recovery fail over use case that were described in connection with the flow diagram 700 described in connection with FIG. 7. Once the test failover is completed, all the restored resources are deleted, but not created PVs. These are retained for eventual use in an actual (or future test) failover.

In general, there are three ways businesses implement data replication and recovery for their applications. The first way is application-level data replication and recovery. Modern distributed applications, for example, Cassandra1M, MongoDB1M, and other database applications are highly scalable and replicated in multiple geographical locations. The applications that may need to be recovered have logic built into them to maintain consistent copies between different geographical locations. As a result, they transparently fail over to healthy sites in case of a disaster outage. The normally executing application and associated computer resources are often referred to as a production application and production site. The healthy, or alternative application and associated computer resources are often referred to as the remote application and remote site.

The approach of replicating the applications in multiple locations has two important requirements that impact the utility. First, the persistent volumes that retain the data in, e.g., the production site and the remote site must be in direct connection to allow consistency of the stateful information in the two sites. Second, additional logic and operational support are required for the remote application to maintain consistency with the production application. One simple example is that software versions must be consistent in both locations.

The second data replication and recovery method is storage-level data replication. In this approach, for applications to failover to a remote site, the remote site must have the latest data. Users rely on storage data replication technologies to replicate production data to the secondary sites. Storage replication can be done in two ways.

Figure 8A:
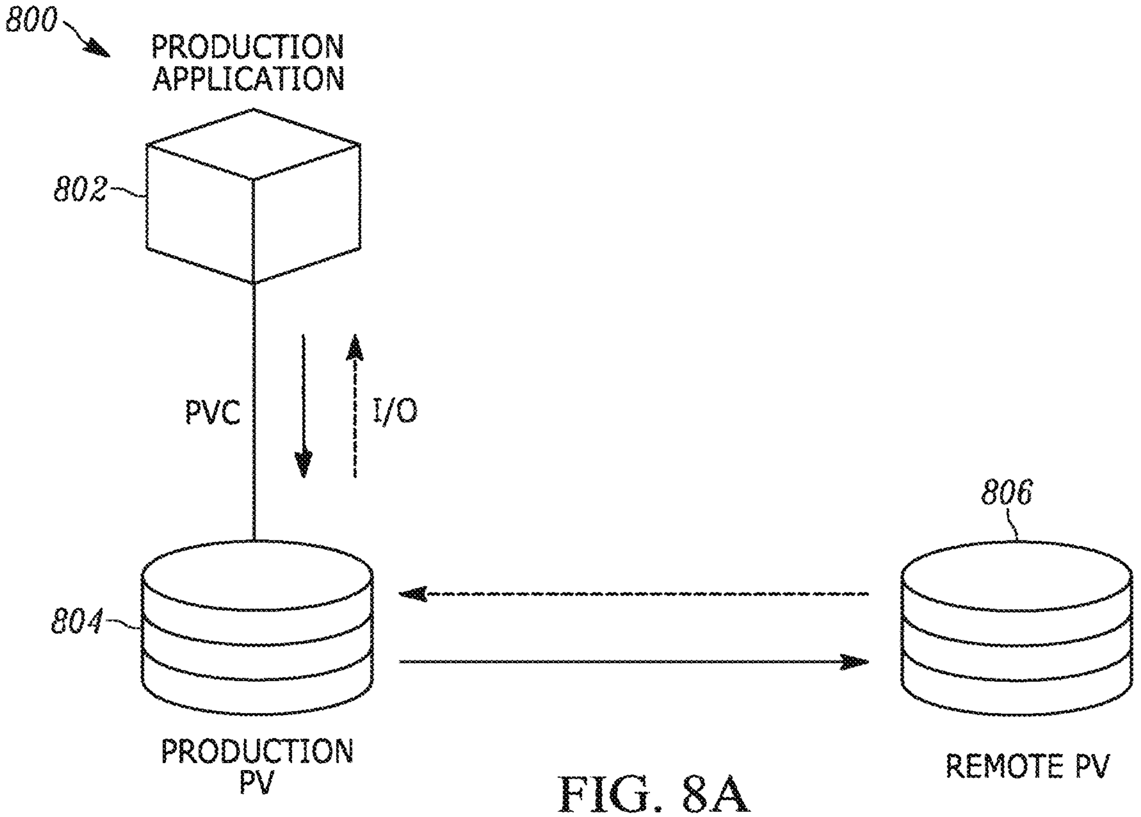
FIG. 8A illustrates a system diagram for a known embodiment of container-based application storage-level data replication and recovery using block-level replication.

The first way is block-level replication where each block is replicated to remote sites consistently. FIG. 8A illustrates a system diagram 800 for a known embodiment of container-based application storage-level data replication and recovery using block-level replication. A production application 802 makes a persistent volume claim, also referred to as a storage request, to a production persistent volume (PV) 804. A remote site persistent volume 806 is directly connected to the production persistent volume 804. Block-level replication can be synchronous replication where every write is written to remote copy before the write is acknowledged to the application. Block-level replication can also be asynchronous replication where the applications' writes are immediately acknowledged and the storage system asynchronously writes the remote copy data.

Figure 8B:
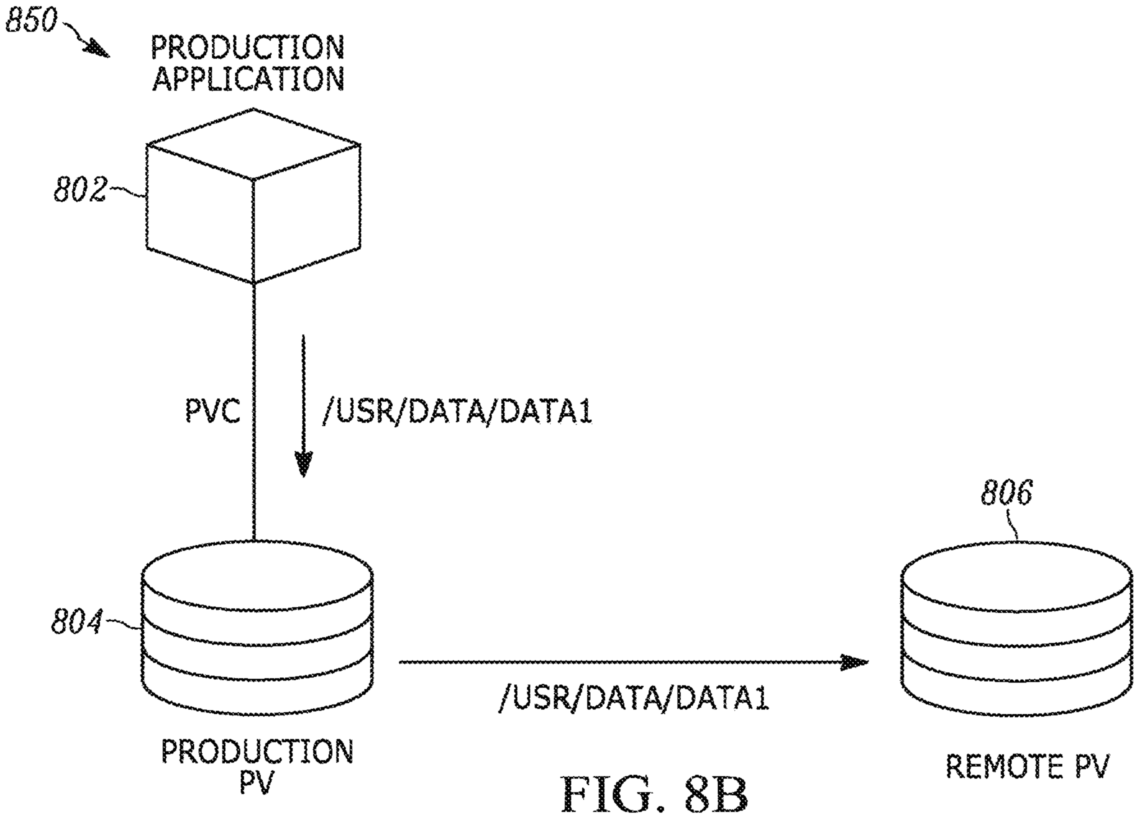
FIG. 8B illustrates a system diagram for a known embodiment of container-based application storage-level data replication and recovery using file-level replication.

The second way is filesystem-level replication where each file is replicated to remote sites consistently. FIG. 8B illustrates a system diagram 850 for a known embodiment of container-based application storage-level data replication and recovery using file-level replication. The setup is the same as that of the known embodiment of container-based application storage-level data replication and recovery using block-level replication. A production application 802 makes a persistent volume claim, also referred to as a storage request, to a production persistent volume (PV) 804. A remote site persistent volume 806 is directly connected to the production persistent volume 804.

A significant challenge with the known methods and systems for continuous restore is the need for a direct connection between the remote site storage and the production site storage. Coordination between remote storage and production storage, as well as the applications using the stored data at production and remote sites, is also needed. The direct connection limits scale, because remote sites and production sites must be pairwise connected. In addition, the applications being replicated that run at the remote site and the production site need to be separately maintained and operated. For example, software versions, as well as numerous other known operational functions and features, need to be consistent, requiring significant and coordinated management operations at both sites.

The third approach to data replication and recovery is recovering the application from a backup media. This is a more streamlined and, overall, a more cost-effective option for continuous restore. By contrast, storage-based replication solutions are expensive and difficult to manage, and users typically reserve storage-based replication solutions for mission-critical applications. For applications that do not have stringent recovery point objective (RPO) and/or recovery time objective (RTO) needs, recovering applications from a backup media can be an attractive alternative. In some embodiments, this approach may not provide zero RPO, but with the right workflow, a backup vendor can implement near-instantaneous failover to the remote site. A challenge with known replication via a backup media is that they address only the data and not the application. As such, backup-media-based replication is needed that backs up not just the data, but the entire application, and application template, associated with the application to be backed up.

One significant benefit of the continuous restore method and system of the present disclosure is that it operates via a backup media, or target storage volume as described herein. As such, the remote site persistent volume does not need direct connectivity to the production site persistent volume as with the two examples of known systems of FIGS. 8A-B. Rather, the two sites connect to a common backup repository. Additionally, not only can data be backed up and restored, but the entire application and/or application template can be backed up and restored.

Figure 9:
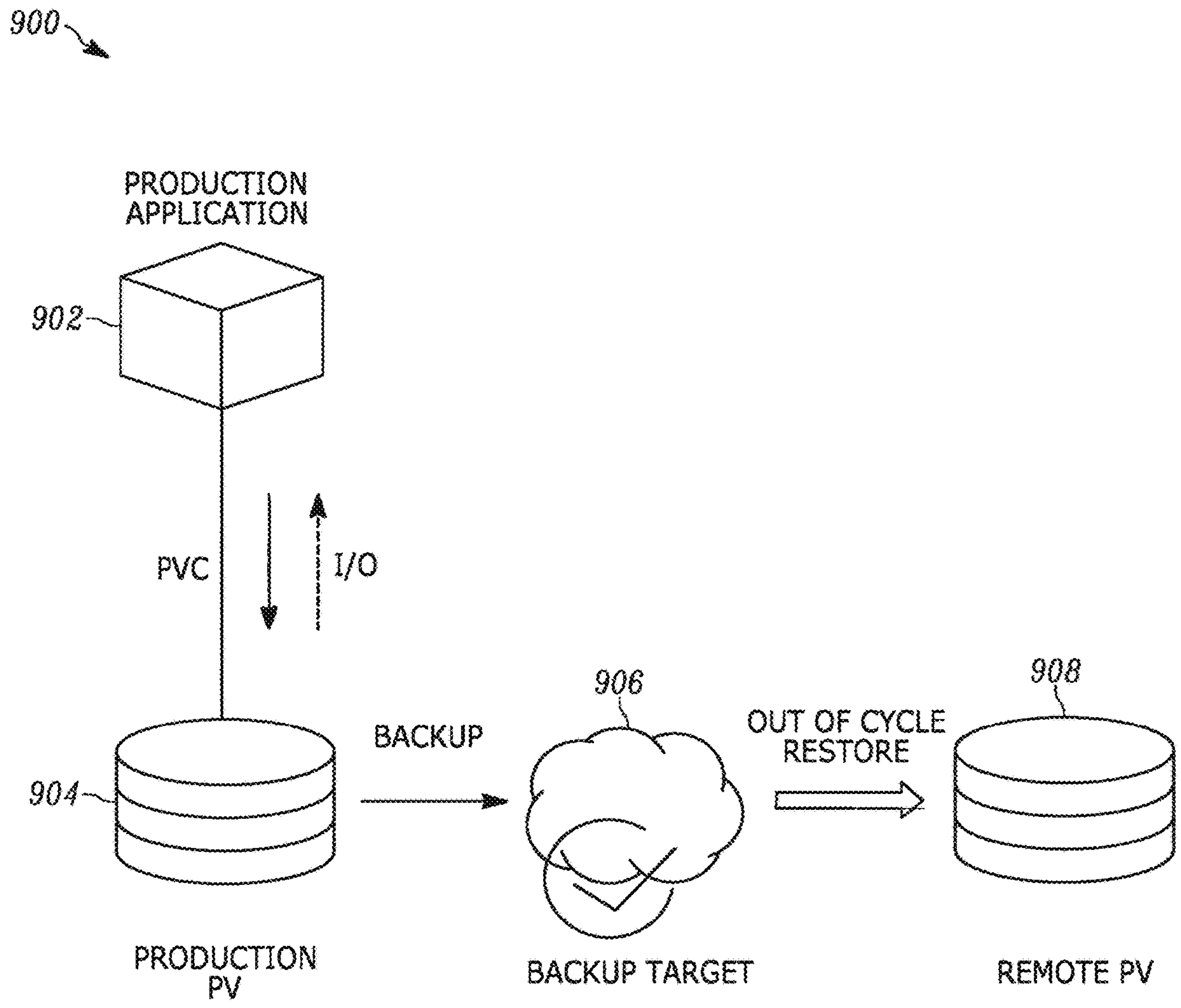
FIG. 9 illustrates a system diagram for an embodiment of a container-based application continuous restore failover using backup media of the present disclosure.

FIG. 9 illustrates a system diagram for an embodiment of a container-based application continuous restore failover system 900 using backup media of the present disclosure. A production application 902 is executing on cloud resources at a production site. For example, the production application 902 could be executed on a particular Kubernetes cluster. The continuous restore system includes a production persistent volume 904 connected to the production application. The recovery application makes a persistent volume claim to the production PV. The PV is connected to a backup target 906, e.g., a storage repository such as a S3 repository. A persistent volume 908 located at a remote site that is different from the production site of PV 904 and application to be recovered 902 is also connected to the backup target 906. In some embodiments, the backup target 906 is S3 storage. In some embodiments, the backup target 906 is NFS storage. A restored application runs at the remote site and connects to the persistent volume 908. The remote persistent volume 908 is synchronized to the backup target 906 using a data synch pod that copies the latest backup delta. In some embodiments, the connection between the remote PV 908 and the backup target supports an out-of-cycle restore.

One feature of the present disclosure is that it supports synchronizing backup images with persistent volumes. Though in some embodiments, all the backup images are QCOW2 images, the data capture process varies based on PVC mode. The PVC modes relate to how data should be synched in the data synch pod. In a file system mode, the QCOW2 is with the file system. The data synch pod uses libguestfs to mount the backup QCOW2. The data synch pod synchronizes files with pvmount, similar to how the restore workflow restores a backup to a PV. For example, in some embodiments, the Linux/Unix command, rsync, which is used to copy and synchronize files and directories, can be used to synchronize the latest backup image with the restored PV. In a block mode, the QCOW2 is a data block. The data sync pod copies a new qcow2 image to the data sync pod/NFS location and does a gemu-img commit on the restored PV. In a VM boot disk mode, the QCOW2 is data blocks. The data sync pod copies a new QCOW2 image to the data mover pod/NFS location and does qemu-img commit on the restored PV data. img file. In VM data disk mode, the QCOW2 is data blocks. The data sync pod copies a new QCOW2 image to the data sync pod/NFS location and does qemuimg commit on the restored PV.

One feature of the data recovery system and method of the present teaching is the use of custom resource definitions (CRD) for important tasks, including coordination of backup applications running at different locations for data protection. In some embodiments, these backup applications protect Kubernetes applications. Coordination between the backup applications at a production and a remote site is one example. In some embodiments, a configuration includes one production cluster and one remote cluster. However, there is no limitation on the number of production clusters and remote clusters that can be used. In fact, in some embodiments, no cluster is designated as a production cluster or a remote cluster. A cluster may be a production cluster for one application and may act as a standby (remote) cluster for another application. As such, good coordination is required between the backup applications when continuous restore workflows are executed.

For example, in some embodiments, when a new backup is created, remote data synch pods need to be communicated about a new backup on the backup target. When new backups are deleted, a corresponding adjustment should be performed on data synch pods, including deleting older backups or the latest backup. When the new backup is full, the data sync pod needs to resync the PV with a full backup image. When new PVs are added/removed on production.

At any given point, the continuous restore workflow must ensure that application data on the remote site is in a consistent state. The data consistency does not necessarily mean that it is in sync with the latest backup. Still, the PVs together hold a consistent copy of the application data, and the application can be restarted without any issues. Remote PVs will discretely transition from a backup to a later backup without ever holding data in an indeterminate state.

To facilitate a robust continuous, restore workflow implementation, a continuous restore data sync CRD, is used at the remote site, and a continuous restore plan CRD is used at the production site. The data sync CRD is responsible for managing data synchronization across PVs associated with a backup plan. A custom resource and a data sync custom resource are created with a backup plan on the backup target. The data sync CRD is responsible for spinning data synch pods based on the latest backup. The plan custom resource, which is described in more detail below, is responsible for generating notification events to the data sync custom resource. If the number of PVs is increased from the previous backup, new PVs are created. If the number of PVs is reduced from the previous backup, old PVs are deleted. Data sync pods are spun to synchronize existing PVS data from the latest backup images. Data sync pods can be restarted. The data sync custom resource will have the status of the backup point-in-time that PVs are synched.

The continuous restore plan CRD is responsible for executing continuous restore workflow for a given backup plan. The remote site is assumed to be only synchronized with the latest backup, and the remote site cannot fail over to an arbitrary backup point-in-time. A continuous restore custom resource is created for a backup plan. In the initial release, there is a one-to-one mapping between a backup plan and a remote site for purposes of the following discussion. However, the system and method are not so limited. For example, multiple remote sites are anticipated, and in some embodiments, each remote site can support a different point-in-time backup plan. The continuous restore custom resource keeps a watch on the new backups associated with the backup plan. The continuous restore plan CRD notifies the presence of a new backup plan to the corresponding data synch custom resource.

In some embodiments, a continuous restore custom resource may only choose to notify successful backups and skip any errored backups. A continuous restore custom resource will continue to read the data sync custom resource status to ensure the current data sync operation is successful. The continuous restore custom resource will not notify the data sync custom resource of any new backups until the current backup is successfully synchronized with the data sync custom resource. In some embodiments, the continuous restore custom resource will have the latest status of the data sync custom resource. In some embodiments, a GUI and the rest of the workflow rely on the continuous restoration of custom resource status for successful failover/test failover operations.

Another feature of the present disclosure is it can support a GUI as an orchestrator for the continuous restore operation. In some embodiments, a user logs into a GUI. The GUI is configured with all relevant clusters that a user would like to manage. All clusters have the continuous restore application installed and support a continuous restore plan CRD and a continuous restore data sync CRD. The user chooses a backup plan that requires continuous restore. The GUI presents an applicable list of clusters/namespaces to the user. Both clusters must have the same target configured, and both clusters have the right version of the continuous restore application installed. In some embodiments, the GUI presents only the clusters that satisfy that condition by some means. The user can choose a cluster/namespace that acts as a continuous restore site for the backup plan. The user can create a continuous restore plan custom resource that corresponds to the backup plan. The GUI displays the latest status of the continuous restore plan and the data sync point with the remote site. Any errors can be correctly presented and, in some methods according to the present disclosure, corresponding corrective actions are also presented to the user. For example, one or more GUIs may be generated and presented to the user, where the user can modify the backup plan on a local/production cluster to reflect changes in user requirements. For example, the user may be allowed to modify at least one of the backup plan schedule, the number of consistent sets to maintain on a remote cluster, the number of backups to maintain on the production cluster, or the number of remote clusters to maintain consistent sets, etc.

One feature of the continuous restore method and system of the present disclosure is that it supports status and error handling. Error handling and notifications are important for a continuous restore use case. Error handling needs to accommodate the complications that arise because various distributed entities are involved in the implementation, production, and remote sites. An important requirement is to surface the right metrics to the end-user. These metrics include, for example, a state of remote site synchronization concerning the production site. This can be, for example, what backup is currently synchronized with the remote site, how much it is lagging from the production site, what backup synchronization is in progress at the remote site, and/or how long it takes to complete the synchronization.

Additional metrics relate to configuration issues, such as PVs that are deleted, a failure to create PVs, PV data synchronization that does not match with backup, and other error conditions requiring prompt notified to the user. In addition, failover and test failover operations must be tracked and reported to the end-user.

Another feature of the present disclosure is that it supports replication after failover. For a resilient and flexible continuous restore use case, some embodiments continue to do replication in the reverse direction after a failover. One feature of the present disclosure is that very little if any centralized information technology administration is needed, thereby reducing the total cost of ownership. Incremental backups can be automatically scheduled on a predefined or on-demand basis. Backups can be easily tested before recovery and can be stored in the open QCOW2 format. The system may quickly recover any Kubernetes or other kinds of containerized applications. The system may selectively restore containers and applications to the same or new name space.

Figure 10:
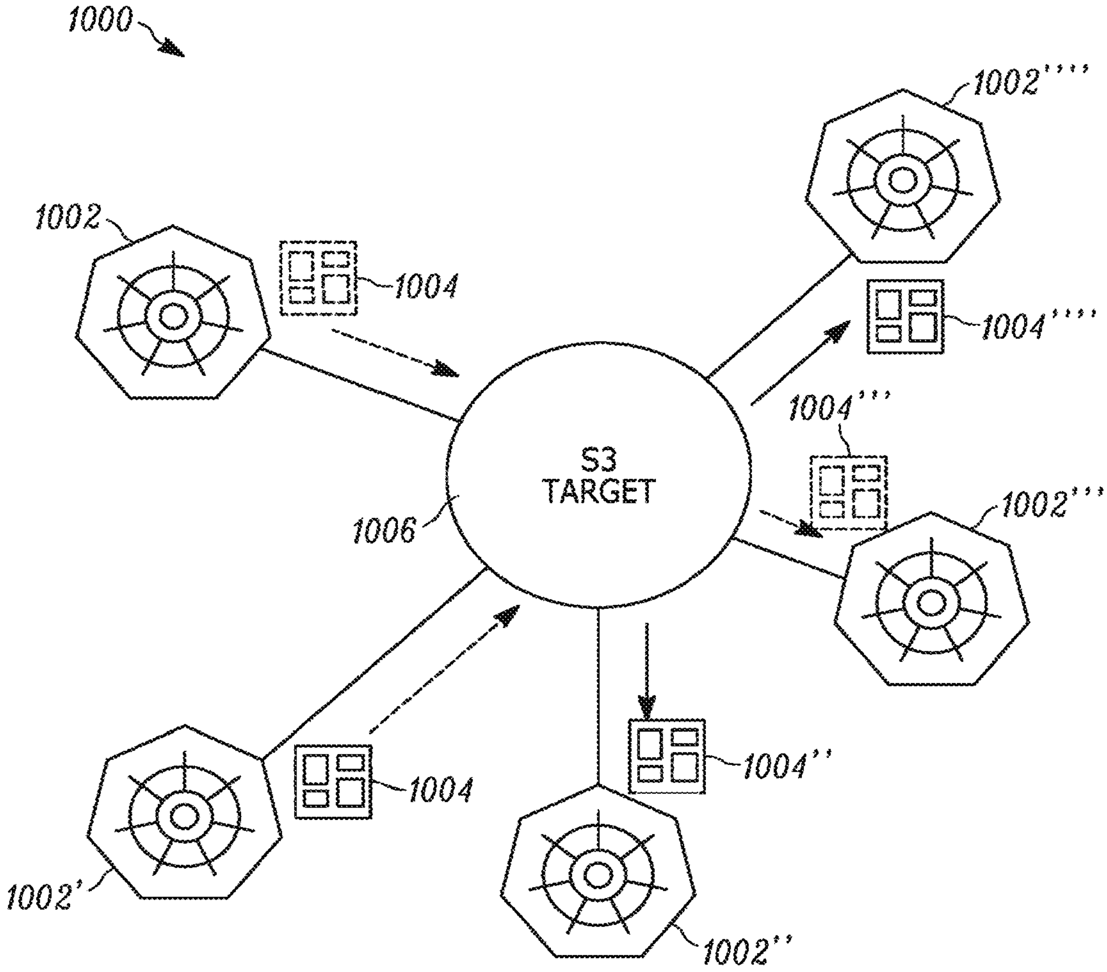
FIG. 10 illustrates an embodiment of a multi-cloud and/or multi-cluster environment running a multi-site continuous restore application of the present disclosure.

One feature of the present disclosure is that it can be configured as a multi-site replication system. FIG. 10 illustrates an embodiment of a multi-cloud and/or multicluster environment 1000 running a multi-site continuous restore application of the present disclosure. A star network configuration is shown. In general, there are no limits on the network topology or the number of sites that continuous restoration applications of the present disclosure can support. For example, enterprises can use multiple public clouds and/or private clouds to implement the computer infrastructure that runs the applications to be backed up. In some embodiments, various configurations of Kubernetes clusters 1002, 1002', 1002'', 1002''', and 1002'''' can run on either or both of the public and private cloud infrastructure (not shown). For example, each Kubernetes cluster can serve as a continuous replication target for any application clusters 1004, 1004', 1004'', 1004''', and 1004''' running on any other Kubernetes cluster clusters 1002, 1002', 1002'', 1002''', and 1002'''. The target storage volume in this embodiment is an S3 target 1006. As illustrated in this embodiment of a multi-cloud and/or multi-cluster environment 1000 running a multi-site continuous restore application, one feature of the present disclosure is that it does not require direct connectivity between a particular cluster that is operating as a production site and a cluster operating as a remote site. This feature can substantially improve scale, cost, and/or complexity as compared, for example, to prior art data replication systems that utilize storage-level data replication, such as the known systems 10 described in connection with FIGS. 8A-B above.

Topology Diagram

As discussed above, the continuous restore system of the present disclosure allows users to stage backups to remote clusters when a new backup is available, recover applications instantly on remote clusters in case of a disaster, and test the restore regularly to gain confidence in their disaster recover plans.

The present system may implement continuous restore as a cloud-native service in multi-cluster and multi-cloud environments. The present system is flexible because it supports a fabric topology where an application in a cluster (e.g., Kubernetes cluster) can designate any other cluster in the fabric as a restore site or cluster. Advantageously, as described with reference to FIGS. 8A-8B and FIG. 11 below, the present system does not assume the connectivity between a source cluster (e.g., production cluster) and a target cluster (e.g., remote cluster). Instead, a backup target is shared and accessible between the source and target clusters without the clusters being directly connected.

Figure 11:
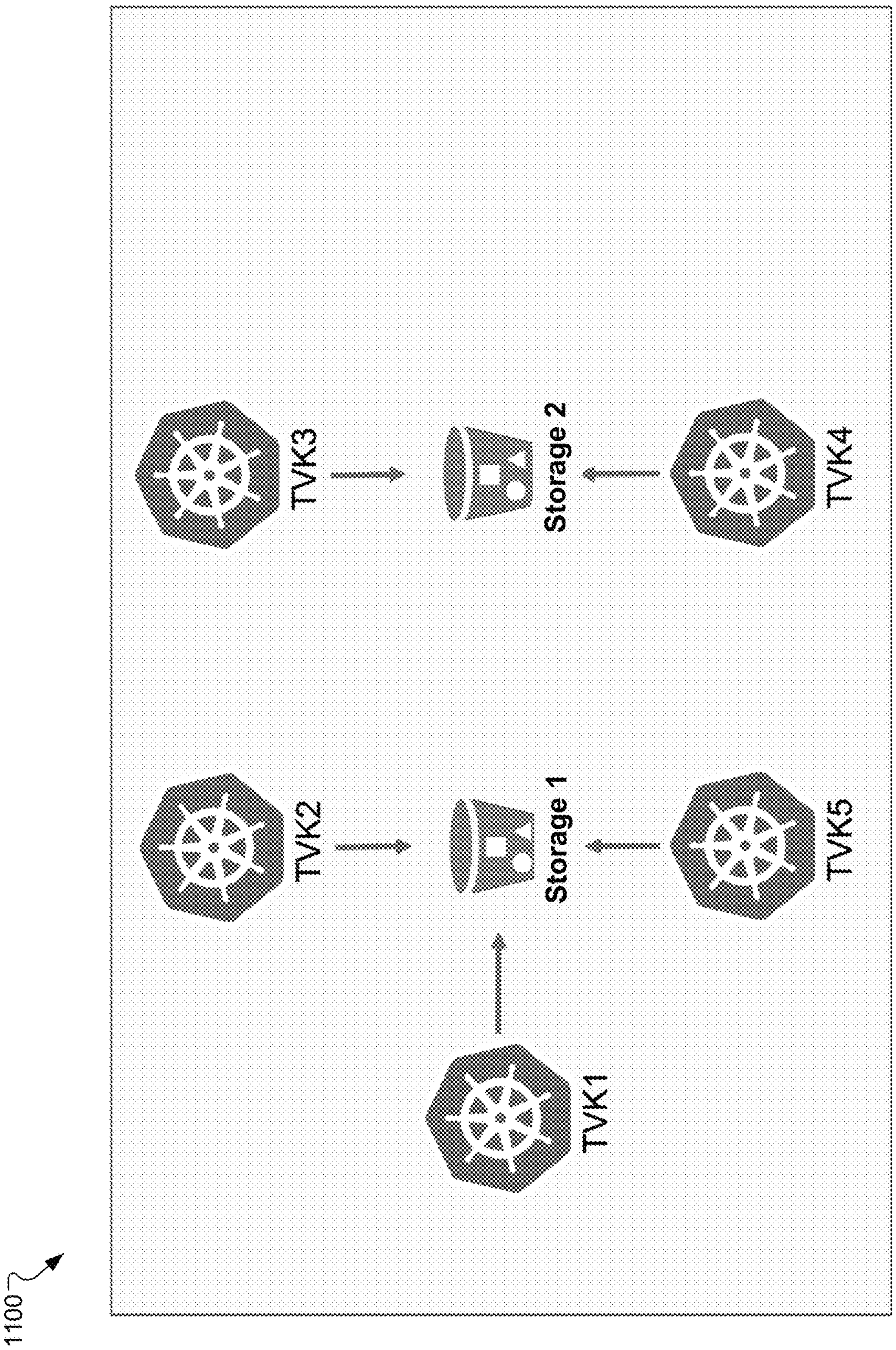
FIG. 11 illustrates an exemplary topology diagram of a multi-cloud and/or multi-cluster environment running a multi-site continuous restore application of the present disclosure, according to some embodiments.

FIG. 11 illustrates an exemplary topology diagram 1100 of a multi-cloud and multi-cluster environment. In some embodiments, a topology diagram includes all the production and remote clusters that participate in the continuous restore of one or more applications, applications running on each cluster, and connectivity to the remote clusters on which one or more backups are restored. In some embodiments, one or more graphical user interfaces are generated for presenting a topology diagram to a user.

The example topology diagram 1100 in FIG. 11 includes clusters TVK1 through TVK5 and storages 1 and 2. As depicted, TVK1, TVK2, and TVK5 are configured to use storage 1 as a backup target. For example, storage 1 can be an S3 bucket or an NFS storage. The present system allows any of TVK1 to TVK5 to be a production cluster or a remote cluster. In some embodiments, an application in a cluster can designate another cluster as a restore cluster in a backup plan associated with the application. For example, in the backup plan of an application in TVK1, TVK2 and TVK5 can be designated as remote sites for continuous restoration of the application. Likewise, an application running on TVK3 can be configured to specify in its backup plan TVK4 as a remote site for continuous restoration.

The continuous restore may stage the persistent volumes' data onto remote clusters as PVs (e.g., as shown in the above FIGS. 5-7). The set of PVs created as part of the restore process may be referred to as a consistent set. A consistent set is a collection of PVs, which stores the data of an application that can be used to guarantee a successful start of the application. Once a consistent set is created from backup data, it can be deleted but cannot be modified.

In some embodiments, the number of PVs in a consistent set matches the number of PVs in the backup of an application. That is, each backup of an application results in a new consistent set that matches the number of PVs in the backup. A consistent set of an application may have the same or different number of PVs from another consistent set of the application, depending on the number of PVs of the corresponding backup that resulted in the consistent set. The consistent sets of an application are independent of each other, which indicates that any consistent set of an application may be deleted without affecting the other consistent sets of the application.

Suppose an application has two storage volumes, and its backup includes backup images for the two storage volumes. In the present system, each time a backup is restored onto a remote cluster, a continuous restore service creates one storage volume (i.e., PV) on the remote cluster with each storage volume backed up on the local cluster. In this example, when the continuous restore service restores the volumes on a remote cluster, it creates two new PVs and copies the data from the backup images to the created PVs. If the data transfer (i.e., copy operation) succeeds, the two PVs construct a consistent set. However, if the data transfer fails, the created PVs do not form a consistent set, i.e., no consistent set is created. In other words, a consistent set includes only storage volumes (PVs) that hold a point-in-time copy of the application, and the application can be restarted from the consistent set. A consistent set always reflects the data at a specific time point of the backup as well as unchanged data.

In some embodiments, the continuous application restoration is enabled per backup plan(s). For example, the present system may allow a user to specify one or more remote clusters to create consistent sets and select option(s) to keep different numbers of consistent sets on each specified cluster, in a backup plan at a source/production cluster. The user may also specify the number of consistent sets created at a remote cluster using a continuous restore policy of the backup plan.

Assuming that a backup plan is created on the production cluster TVK1 in FIG. 11, it designates TVK2 and TVK5 as remote clusters for continuous restore, and specifies that TVK2 holds four consistent sets and TVK5 holds six consistent sets. Once a user creates or updates this backup plan, TVK2 and TVK5 will be notified and create consistent sets (i.e., four consistent sets on TVK2 and six consistent sets on TVK5) from the latest backups. Responsive to these consistent sets being created at the remote clusters TVK2 and TVK5, source cluster TVK1 gets notified and updates its backup plan with the actual number of consistent sets created on the remote sites.

Services for Continuous Restore of Applications

Continuous restore is a distributed service including event target, syncher, watcher, continuous restore controller, responder, etc. The continuous restore service is installed and executed on each cluster in a multi-cloud and multi-cluster environment such that an application running on a cluster (i.e., a production/local cluster) can continuously restore its backups to one or more designated remote clusters.

Figure 12:
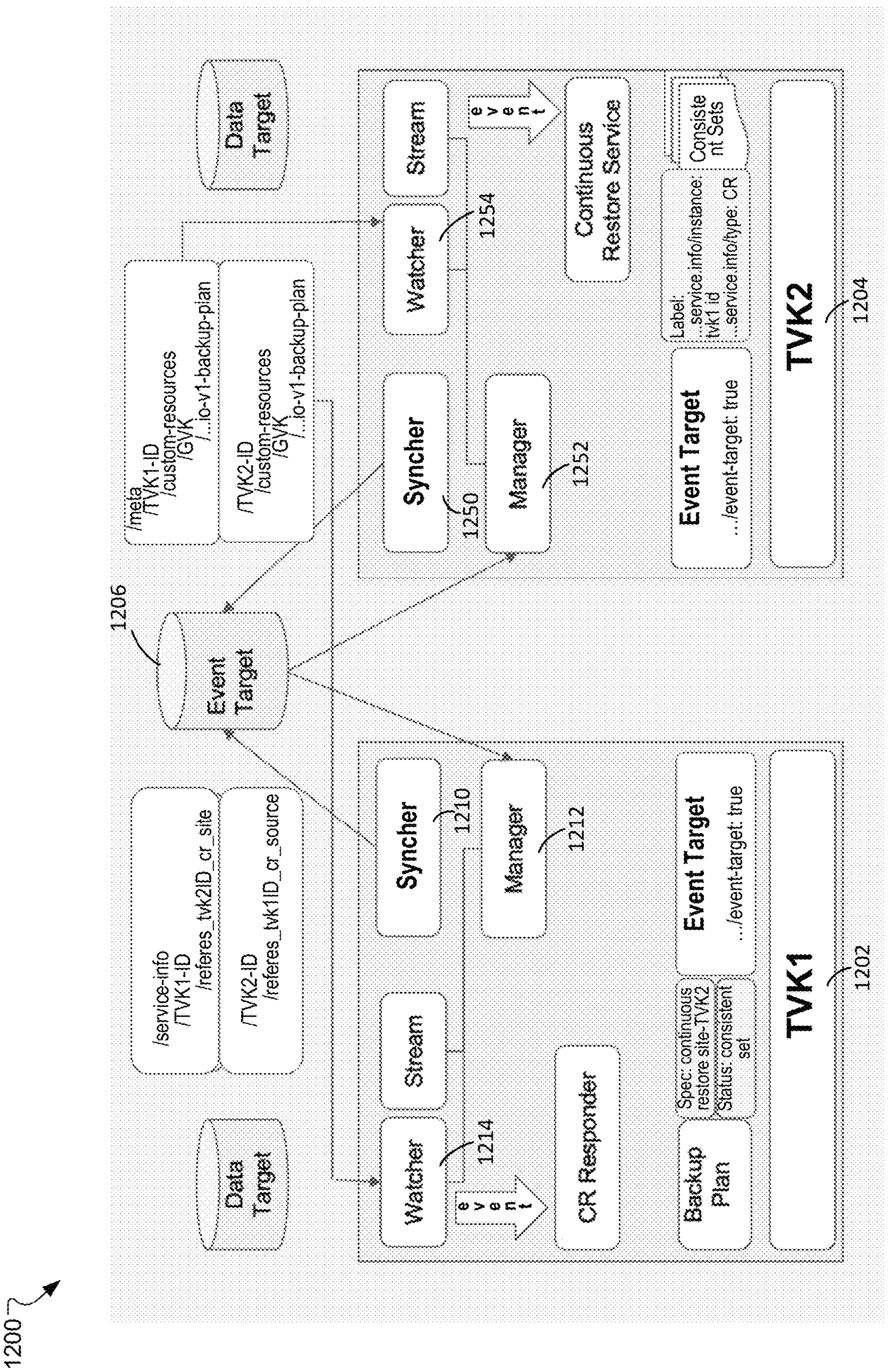
FIG. 12 illustrates an exemplary collection of services deployed on each cluster for continuous restore in a multi-cloud and multi-cluster environment, according to some embodiments.

FIG. 12 illustrates an exemplary collection of services 1200 deployed on each cluster for continuous restore in a multi-cloud and multi-cluster environment. In the depicted example, cluster 1202 (i.e., TVK1) is configured to be a production cluster for a specific application (it can be a remote cluster for another application at the same time), and cluster 1204 (i.e., TVK2) is designated as a remote cluster for the specific application. Through an event target 1206, cluster 1202 communicates with cluster 1204 to perform a continuous restore of that application.

Event Target

Object storage (e.g., NFS storage, S3 storage) may be used as a backup target to copy and move backup data of an application (e.g., application data, application metadata) between clusters, for example, as shown in FIGS. 5-7 and 9. In some embodiments, in addition to functioning as a backup target, the object storage may also be configured as an event target to establish the communications between the clusters. The present system may use the event target to exchange state information between the clusters. Depending on the state information stored in the event target (e.g., 1206), the clusters (e.g., 1202 and 1204) can participate in continuous restore of applications without a direct connection between the clusters. In some embodiments, the same backup target is configured as an event target to communicate and enable the clusters to participate in continuous restore. In other embodiments, multiple event targets may participate in continuously restoring applications.

When a new event target resource is created, a target controller (not shown) may spawn two new services: syncher and service manager. For example, in FIG. 12, when event target 1206 is created, syncher 1210 and service manager 1212 are generated in production cluster 1202, and syncher 1250 and service manager 1252 are generated in remote cluster 1204. Using the new services, the present system may store the state information related to continuous restore in a designated directory of event target 1206. The state information may include one or more of cluster backup plans, new backups, consistent sets, other metadata, etc. A remote cluster (e.g., 1204) may then poll event target 1206 for any updates regarding the current clusters and act accordingly.

Syncher

A syncher service/module (e.g., 1210, 1250) runs on every cluster where an event target is configured. The syncher service is mainly used to persist the state of cluster resources to an event target and ensure the persistent state on the event target is in sync with the cluster resources. In general, the syncher service is cluster-specific, which is only responsible for synchronizing the cluster resources state on that cluster with the corresponding persistent state on the corresponding event target. For example, syncher 1210 on the local/production cluster 1202 may copy a backup plan of an application running on cluster 1202 to event target 1206 for synchronizing the cluster resources state of production cluster 1202.

In some embodiments, when a user specifies an event target, the target controller (not shown) may validate the target, and then create a syncher deployment, a service manager deployment, and a resourcelist configuration. The syncher deployment causes the generation of a syncher service on each cluster. The syncher service running on a cluster may store the current state of the cluster onto the event target and populate "service-info" (described below) with information related to the continuous restore. With the syncher service, the current state of a cluster is stored, updated, and maintained on the event target. For example, synchers 1210 and 1250 respectively synchronize the state of clusters 1202 and 1204 on event target 1206.

In some embodiments, the syncher on each cluster manages two blobs of a persistent state: meta and service-info. The meta blob may be a meta directory that includes all yaml files of all the resources that the cluster manages. These resources may include, but are not limited to, policies, hooks, targets, backup plans, backups, and consistent sets. The service-info blob/directory may include information about a particular service that the current cluster resources reference. For example, a backup plan on cluster 1202 (i.e., TVK1) references cluster 1204 (i.e., TVK2) as a remote site for creating consistent set(s). The syncher 1210 on cluster 1202/TVK1 then records the information that TVK1 references TVK2 in the service-info blob.

The syncher on a remote cluster also records the information of consistent set on an event target. In some embodiments, one or more controllers manage the lifecycle of cluster resources such as backup plans, backups, consistent sets, etc. Continuing with the above example, a continuous restore controller running on remote cluster 1204 or TVK2 may create a consistent set including a set of persistent volumes, and copy data of a new backup from a backup target to the created consistent set. The syncher 1250 on remote cluster 1204 may then record the created consistent set on event target 1206.

In some embodiments, the syncher service running on each cluster may also record the heartbeat of the cluster such that other participating clusters know the health of the continuous restore service. In some embodiments, one or more graphical user interfaces are generated for displaying the health status of the continuous restore services running on the production and remote clusters, where the services may include at least the syncher service, watcher service, responder service, etc.

Service Manager

The service manager, e.g., 1212 and 1252 respectively running on clusters 1202 and 1204, manages the lifecycle of the watcher and continuous restore service stack. In some embodiments, the service manager on a cluster may monitor the service-info directory present on the event target and determine whether a valid record exists (e.g., whether a parent instanceID is present in a discovered file). Responsive to finding an existing valid record, the service manager may spawn one or more appropriate services (e.g., watcher) on the cluster. The service manager may also update the configmap prepared for the watcher service (e.g., to update the instanceID to be monitored).

Watcher

A watcher service (e.g., 1214, 1254 in FIG. 12) is responsible for monitoring the changes in resource state on the event target and generating corresponding events on the host cluster. In some embodiments, to allow the watcher to properly function, it is required that the same event target (e.g., 1206) be configured between the clusters (e.g., 1202 and 1204), and the source cluster's syncher service (e.g., 1210) create and update the persistent state of cluster resources on the event target. The watcher listens to the signals of the syncher to generate corresponding events.

In some embodiments, once the backup plan associated with an application on a production cluster (e.g., 1202) references another cluster (e.g., 1204) as a remote cluster for creating consistent set(s), the watcher (e.g., 1254) running on the remote cluster may identify that this specific cluster, i.e., cluster 1204, participates in the continuous restore operation for the application. The watcher on the remote cluster (e.g., 1254) may also identify a new backup on a backup target and enable a consistent set resource to be created on the remote cluster (e.g., 1204) after the backup service on the production cluster (e.g., 1202) identified PVs containing the application data and application metadata and copied the identified data from the identified PVs to the backup target based on the backup plan schedule included in the backup plan. In some embodiments, a continuous restore service (described below) on the remote cluster may create snapshots of the PVs of the consistent set for each backup to save storage footprint. The watcher on the remote cluster (e.g., 1254) may further monitor changes to application configuration and a number of the PVs and enable the next backup to be updated to reflect the changes. Application configuration is a blueprint that makes up all resources and their properties. In some embodiments, the application configuration includes all yaml files that relate to pods, secrets, config resources, images, IP addresses, PV, and persistent volume claims (PVCs).

In FIG. 12, the service manager 1212, 1252 manages the lifecycle of the watcher, i.e., respectively starts and stops the watcher 1214, 1254. In some embodiments, an event target controller (not shown) may create a configMap (e.g., "<target_name>-resource-list/<target_name>-<target_ns>-resource-list,") and share the configMap between the service manager, syncher, and watcher service. The service manager 1212, 1252 may then initiate the watcher service when at least one instance ID is to be watched on the event target.

Once the watcher service starts, it mounts the event target inside a watcher container and reads from the event target. In some embodiments, the watcher may use a data store-attacher for S3-based targets, or use NFS PVs for NFS-based targets. In some embodiments, the watcher may also be configured to watch a new instance ID by the service manager using configMap.

In some embodiments, the watcher or syncher on each cluster may go offline for a period of time. Each cluster is configured to catch up the the current state of backups and consistent sets and update respective clusters. When the syncher or watcher goes offline for extended periods of time, any new backups created will not be saved to the event target and hence the watcher will not be notified of the new backups on a local/production cluster. When the syncher service comes online, it starts saving all backup records to the event target, and the watcher can generate appropriate alerts on the remote cluster. This is especially useful when recovering service from a failure.

NATS Server

In some embodiments, the watcher service (e.g., 1214, 1254) is configured to collect data on state changes from the event target on the host cluster and publish the collected data as one or more events. The events may be stored in a NATS server so that consumer services (e.g., continuous restore service and continuous restore responder described below) can consume them as required. The NATS service may be used with a watcher, syncher, and service manager to enable communications across clusters.

NATS service is responsible for receiving, storing, and publishing events generated by watchers and pushing the events to local consumer services (e.g., continuous restore service, continuous restore responder) according to their subscriptions. In some embodiments, the service manager (e.g., 1212, 1252) starts and stops the NATS service. For example, the service manager may start the NATS service once it discovers that certain operations need to be performed for other instances. In some embodiments, the NATS service may be initiated by the service manager only if the watcher service will watch at least one instance ID.

To publish events to NATS, the watcher service (e.g., 1214, 1254) may generate events, create a NATS client, and push events to the NATS service. In some embodiments, the watcher will create only one NATS stream on the NATS server. The NATS server can have one or more NATS subjects depending on the instance(s).

In an event generation control flow, the watcher service may create a NATS jetstream client and publish events to the NATS server. The created NATS client may then determine if a stream named "INSTANCES" is present on the NATS server. If the stream is not present, the NATS client may generate an event retention policy with a specific time-period setting (e.g., one day) so that every event on this stream will be automatically deleted after the specific time (e.g., one day).

Continuous Restore Service and Responder

The service manager enables continuous restore services when the manager finds its instance ID reference in the service-info directory on the event target. In some embodiments, the continuous restore service may mount the event target 1206 and subscribe to the events in the NATS jetstream for the instances. Once receiving the events from the NATS, the continuous restore service starts processing or consuming the events. In some embodiments, the continuous restore service may process the events related to restore and backup policies and create the required data target, continuous restore plan, consistent sets, etc. The continuous restore service may also synchronize between the continuous restore configuration in the backup plan(s) and the current state in a destination cluster.

Continuous restore service operations are idempotent. Even after restart, the continuous restore service may start processing the event from where it left off and ignore the already-processed events. In some embodiments, the continuous restore service determines the operations to be performed based on the events received from the NATS service and the current state of the cluster.

In some embodiments, the continuous restore service is an integrated service including a syncher, watcher, service manager, event target controller, continuous restore controller, and responder. When a backup service is performed on a local/production cluster for generating backups of applications and moving backups to a backup target (e.g., based on scheduling and retention policies), the continuous restore service may be performed on a remote cluster for retrieving the data from the backup target. In some embodiments, the continuous restore service on a remote cluster may also delete old consistent sets to maintain a required number of consistent sets that is specified in a backup plan.

The continuous restore service runs on a remote cluster for creating continuous restore and consistent set resources based on event processing. On the other hand, a continuous restore responder runs on a local/production cluster that responds to state changes on the remote cluster. The continuous restore responder may synchronize the status of consistent set resources with a backup plan and backup resources. For example, once a consistent is created on a remote cluster in response to a new backup, the syncher service on the remote cluster may add the consistent set record to an event target. Upon receiving this record from the event target, the continuous restore responder may update the corresponding backup plan to reflect the status of the new consistent set on the remote cluster.

GUIs in Continuous Restore Operations

As discussed above, one advantage of the present disclosure is it supports GUIs as an orchestrator for continuous restore operations. One or more GUIs are generated in production or remote clusters and presented to users to provide input necessary to accomplish the continuous restore operations. In some embodiments, a production cluster may be configured to generate and present a GUI for a user to choose a consistent set on a remote cluster to restore an application. The continuous restore operation of the application includes recreating application pod(s) (e.g., data mover pod, data sync pod) from a backup of the application based on application template(s) and customizing the application template(s) to fit a remote cluster environment. An application template may include secrets (e.g., passwords), application configurations (e.g., PV, PVCs), or pod specifications. Customizing an application template includes changing one or more of load balancer settings, public IP addresses, domain names, or storage classes. The settings for load balancing (i.e., reverse proxy) may include onboarding a new public IP address and routing the traffic on the public IP address to the internal IP addresses of application servers.

In some embodiments, a production cluster may further be configured to generate and present a GUI for a user to choose a consistent set on a remote cluster to test the restoration of an application. As shown in FIGS. 6A-6B, the test operation includes recreating application pod(s) from a backup of the application based on application template(s), customizing the application template(s) to fit a remote cluster environment, shutting down the application artifacts (e.g., pods), and deleting application artifacts while data on a consistent set is intact.

GUIs may also be generated and presented to users to facilitate the continuous restoration in some other ways. In some embodiments, one or more GUIs may be generated to provide option(s) for a user to create, modify, or delete a backup plan. In some embodiments, one or more GUIs may be used to display the health status of each service (e.g., syncher, watcher) running on the production and remote clusters. In some embodiments, one or more GUIs may be used to display information related to a backup plan. For example, the GUIs may display (i) a backup policy associated with each application and/or (ii) a lag between the number of actual consistent sets and a desired number of consistent sets. For example, a lag may occur when a local cluster has n backups but the designated remote cluster may have only n-m consistent sets created. A lag of m consistent sets needs to be created to match the n backups, where integer n is larger than the integer m.

In some embodiments, one or more GUIs may also be generated to display a cost associated with a backup plan. The cost includes an operation cost in a specific interval (e.g., per month) and an amount of compute resources used for the continuous restore. In some embodiments, the present system may also compute performance metrics associated with creating backups and consistent sets and provide predictive analytics based on the performance metrics. At least one GUI may be generated for displaying the performance metrics and predictive analytic results to users.

Lifecycle of Backup Plan

Below is a summary indicating how the present system described herein creates backups of an application (e.g., a containerized application) and continuously restores the application from the backups based on a backup plan associated with the application in a multi-cloud and multi-cluster environment, i.e., a lifecycle of the backup plan.

1. Backup software that includes continuous restore functionality is installed on all clusters (e.g., by an administrator) in the multi-cloud and multi-cluster environment.
2. A backup target is designated as an event target (e.g., from an administrator), and the event target is configured to be accessible by all the clusters participating in continuous restore functionality in the environment.
3. An application (e.g., a containerized application) is identified (e.g., by a user), where the application runs on a local/production cluster and needs to be continuously restored.
4. On the local cluster, one or more options and/or GUIs are generated and provided for the user to create a backup plan for the application. The backup plan includes at least one or more of a scheduling policy, a retention policy, and a continuous restore policy. The continuous restore policy includes a list of remote clusters and the number of backups staged on each cluster.
5. On the local cluster, a syncher service is started to upload the new backup plan to the event target.
6. On the remote cluster, a watcher service is triggered to monitor the resource state changes. The watcher determines that its remote cluster (i.e., the cluster on which the watcher is running) is referenced in the backup plan and generates a backup plan arrival event. Upon listening to the backup plan arrival event, a continuous restore service running on the remote cluster creates continuous restore resources for the backup plan.
7. The syncher uploads the continuous restore resources to the event target on the remote cluster.
8. On the local/production cluster, the watcher monitors and receives the event of the continuous restore resource corresponding to the backup plan and generates a continuous restore resource creation event.

9. On the local/production cluster, upon listening to the continuous restore resource creation event, a continuous restore responder updates the backup plan status to show that the remote cluster has created the continuous restore resources. As such, a handshake is established between the local and remote clusters.
10. On the local cluster, a backup service is triggered to create a new backup for the application according to the scheduling policy of the backup plan.
11. The syncher on the local cluster updates the event target to indicate that a new backup is available for the backup plan.
12. The watcher on the remote cluster generates an event for the new backup.
13. The continuous restore service on the remote cluster creates a consistent set resource for the new backup. The consistent set includes a list of new storage volumes for every storage volume backup of the application. The continuous restore service then copies the backup image data to new storage volumes, and upon successfully copying the data, marks the consistent set as available.
14. The sycher on the remote cluster now uploads the consistent set resource metadata to the event target.
15. The watcher on the local cluster generates an event for the new consistent set on the remote cluster.
16. The continuous restore responder on the local/production cluster updates the backup resource with consistent set information.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A system for continuously restoring applications comprising:

a production cluster with one or more applications running on the production cluster;

one or more remote clusters configured to continuously restore the one or more applications running on the production cluster from a backup of each of the one or more applications; and an event target configured to establish communication between the production cluster and the one or more remote clusters;

wherein:

each of the remote clusters and the production cluster comprises a syncher service and a watcher service executing thereon, in response to the watcher service executing on a first one of the remote clusters determining that the first one of the remote clusters is referenced in a backup plan, the syncher service executing on the first one of the remote clusters sends at least one event to the event target, and in response to the watcher service on the production cluster determining that the at least one event is received by the event target, the communication between the production cluster and the first one of the remote clusters is established via the event target, the backup is generated by a backup service on the production cluster based on the backup plan, and the syncher service on the production cluster updates the event target to indicate the backup is available.

2. The system of claim 1, wherein:

the production cluster and the one or more remote clusters are configured relative to applications running on each of the production cluster and the one or more remote clusters, and the production cluster and the one or more remote clusters are configured by designating a particular cluster as a product cluster for an application and as a remote cluster for another application.

3. The system of claim 1, wherein:

the backup plan includes one or more of scheduling policies, retention policies, or continuous restore policies, a schedule policy defines a backup schedule and a type of the backup, the backup schedule including a frequency at which backups are generated, and the type including a full backup or an incremental backup, a retention policy defines a number of backups to retain, and a continuous restore policy defines the one or more remote clusters on which an application is restored and a number of consistent sets to maintain on each remote cluster of the one or more remote clusters.

4. The system of claim 1, wherein the watcher service on first one of the remote clusters specified in the backup plan is executed to identify that the first one of the remote clusters participates in continuous restore operations of the application.

5. The system of claim 1, wherein:

the event target is a backup storage, the backup storage is at least one of a simple storage service (S3) compatible storage or a network file system (NFS) storage, and the event target is configured to be accessible to the production cluster and the one or more remote clusters such that the production cluster can communicate with the one or more remote clusters through the event target without a direct network connection between the production cluster and the one or more remote clusters.

6. The system of claim 1, wherein the syncher service on the production cluster is executed to copy the backup plan to the event target.

7. The system of claim 1, wherein the backup is a full backup of an application of the one or more applications generated by the backup service, and wherein the system is configured to:

identify, by the backup service on the production cluster, one or more persistent volumes containing application data and application metadata;

copy, by the backup service on the production cluster, the application data and application metadata from the one or more persistent volumes to a backup target based on a backup plan schedule included in the backup plan associated with the application;

identify, by the watcher service on the first one of the remote clusters, a new backup on the backup target;

create, by a continuous restore controller of the first one of the remote clusters, a consistent set including a set of persistent volumes;

copy, by the continuous restore controller of the first one of the remote clusters, data of the new backup from the backup target to the consistent set;

record, by the syncher service on the first one of the remote clusters, the created consistent set on the event target;

identify, by the watcher service on the production cluster, a record of the consistent set corresponding to the new backup; and update, by the watcher service on the production cluster, a production cluster backup record based on the identified record.

8. The system of claim 7, wherein the watcher service on the first one of the remote clusters is further configured to:

monitor changes to application configuration and a number of the persistent volumes; and enable a next backup to be updated to reflect the changes.

9. The system of claim 7, wherein the first one of the remote clusters is further configured to perform a continuous restore service to create snapshots of the persistent volumes of the consistent set for each backup to save storage footprint.

10. The system of claim 7, wherein the first one of the remote clusters is further configured to perform a continuous restore service to delete old consistent sets to maintain a required number of consistent sets, wherein the required number is specified in the backup plan.

11. The system of claim 7, wherein:

the production cluster is further configured to generate and present one or more graphical user interfaces for a user to modify the backup plan associated with the application on the production cluster to reflect changes in user requirements, and modifying the backup plan comprises modifying at least one of the backup plan schedule, a number of consistent sets to maintain on the remote cluster, a number of backups to maintain on the production cluster, or a number of remote clusters to maintain consistent sets.

12. The system of claim 1, wherein the backup is an incremental backup of an application of the one or more applications.

13. The system of claim 1, wherein the production cluster is further configured to generate and present a graphical user interface for a user to choose a consistent set on the first one of the remote clusters to restore an application of the one or more applications, wherein restoring the application comprises:

recreating one or more application pods from the backup of the application based on one or more application templates, an application template including at least one of secrets, application configurations, or pod specifications; and customizing the one or more application templates to fit a remote cluster environment of the first one of the remote clusters, wherein the customizing comprises changing one or more of load balancer settings, public internet protocol (IP) addresses, domain names, or storage classes.

14. The system of claim 1, wherein the production cluster is further configured to generate and present a graphical user interface for a user to choose a consistent set on the first one of the remote clusters to test the restore of an application of the one or more applications, wherein testing the restore of the application comprises:

recreating one or more application pods from the backup of the application based on one or more application templates, an application template including at least one of secrets, application configurations, or pod specifications;

customizing the one or more application templates to fit a remote cluster environment of the first one of the remote clusters, wherein the customizing comprises changing one or more of load balancer settings, public IP addresses, domain names, or storage classes;

shutting down the one or more application pods; and deleting the one or more application pods while leaving data on a consistent set intact.

15. The system of claim 1, wherein the one or more applications are container-based, virtual machine based, or a combination thereof.

16. The system of claim 1, wherein the event target comprises a plurality of event targets participating in continuously restoring the one or more applications.

17. The system of claim 1, wherein the production and the one or more remote clusters reside in on-premise data centers, public clouds, or a combination of the foregoing.

18. The system of claim 1, wherein the first one of the remote clusters and the production cluster is further configured to:

obtain a current state of backups and consistent sets after at least one of the watcher services or syncher services is offline for a period of time; and perform an update of each based on the current state.

19. The system of claim 1, wherein the production cluster communicates with the one or more remote clusters to generate one or more graphical user interfaces to display data related to continuous restore operations.

20. The system of claim 19, wherein the one or more graphical user interfaces are generated by providing one or more options for a user to create, modify, or delete the backup plan.

21. The system of claim 19, wherein the one or more graphical user interfaces are generated by displaying a topology diagram, the topology diagram including all the production and remote clusters that participate in continuous restoration of the one or more applications, applications in each cluster, and connectivity to remote clusters on which one or more backups are restored.

22. The system of claim 19, wherein the one or more graphical user interfaces are generated by displaying a health status of one or more services running on the production and remote clusters, wherein the one or more services include at least the syncher service and the watcher service.

23. The system of claim 19, wherein the one or more graphical user interfaces are generated by displaying (i) a backup policy associated with each of the one or more applications and (ii) a lag between a number of actual consistent sets and a desired number of consistent sets.

24. The system of claim 19, wherein the one or more graphical user interfaces are generated by generating and displaying a cost associated with the backup plan, the cost including at least an operation cost in an interval and an amount of compute resources used for the continuous restore.

25. The system of claim 19, wherein the production cluster and the one or more remote clusters are configured to:

generate and display performance metrics associated with creating backups and consistent sets; and provide predictive analytics based on the performance metrics.

26. A method for continuously restoring applications comprising:

providing an event target to establish communication between a production cluster and one or more remote clusters, wherein the production cluster includes one or more applications running on the production cluster, the one or more remote clusters continuously restore the one or more applications running on the production cluster from a backup of each of the one or more applications, and each of the remote clusters and the production cluster comprises a syncher service and a watcher service executing thereon;

determining, by the watcher service executing on a first one of the remote clusters, that the first one of the remote clusters is referenced in a backup plan;

sending, by the syncher service executing on the first one of the remote clusters, at least one event to the event target;

determining, by the watcher service executing on the production cluster, that the at least one event is received by the event target; and in response to determining that the at least one event is received by the event target:

establishing the communication between the production cluster and the first one of the remote clusters via the event target; and updating, by the syncher service executing on the production cluster, the event target to indicate the backup is available, wherein the backup is generated by a backup service on the production cluster based on the backup plan.

27. The method of claim 26, wherein:

the event target is a backup storage and is accessible to the production cluster and the one or more remote clusters such that the production cluster can communicate with the one or more remote clusters through the event target without a direct network connection between the production cluster and the one or more remote clusters, and the backup storage is at least one of a simple storage service (S3) compatible storage or a network file system (NFS) storage.

* * * * *